United States Patent
Papasakellariou

(10) Patent No.: US 12,463,783 B2
(45) Date of Patent: Nov. 4, 2025

(54) METHOD AND APPARATUS FOR DETERMINING RESOURCES FOR PUCCH TRANSMISSION WITH ACKNOWLEDGMENT INFORMATION

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 811 days.

(21) Appl. No.: 17/652,664

(22) Filed: Feb. 25, 2022

(65) Prior Publication Data

US 2022/0278809 A1   Sep. 1, 2022

Related U.S. Application Data

(60) Provisional application No. 63/155,116, filed on Mar. 1, 2021, provisional application No. 63/185,163, filed
(Continued)

(51) Int. Cl.
*H04L 5/00* (2006.01)
*H04W 72/23* (2023.01)

(52) U.S. Cl.
CPC ........... *H04L 5/0055* (2013.01); *H04W 72/23* (2023.01)

(58) Field of Classification Search
CPC ... H04W 28/04; H04W 72/04; H04W 72/042; H04W 88/08; H04W 72/23; H04W 72/1289; H04L 5/0007; H04L 5/0055
(Continued)

(56) References Cited

U.S. PATENT DOCUMENTS 11,785,650 B2 * 10/2023 Jeon ..................... H04W 76/11
                                              370/329
2012/0263127 A1 * 10/2012 Moon ................... H04W 72/23
                                              370/329
(Continued)

FOREIGN PATENT DOCUMENTS

KR          4 210 260 A1 *   7/2023   ........... H04L 1/1861

OTHER PUBLICATIONS

3GPP TSG-RAN WG1 Meeting #104-e, e-Meeting, Jan. 25-Feb. 5, 2021, R1-2101726, Agenda item: 8.12.1, Source: Ericsson, Title: Mechanisms to support MBS group scheduling for RRC_Connected UEs. (Year: 2021).*
(Continued)

*Primary Examiner* — Peter G Solinsky
*Assistant Examiner* — Sanjay K Dewan

(57) ABSTRACT

Methods and apparatuses for determining and multiplexing acknowledgment information. A method for operating a user equipment includes receiving: information for first resources for physical uplink control channel (PUCCH) transmissions to provide hybrid automatic repeat request acknowledgement (HARQ-ACK) information in response to semi-persistently scheduled (SPS) physical downlink shared channel (PDSCH) receptions associated with a first radio network temporary identifier (RNTI) from a first set of RNTIs, and information for second resources for PUCCH transmissions to provide HARQ-ACK information in response to SPS PDSCH receptions associated with a second RNTI from a second set of RNTIs. The method further includes determining a first resource from the first resources for a first PUCCH to provide only: first HARQ-ACK information in response to first SPS PDSCH receptions associated with the first RNTI, and second HARQ-ACK information in
(Continued)

response to second SPS PDSCH receptions associated with the second RNTI; and transmitting the first PUCCH.

15 Claims, 13 Drawing Sheets

Related U.S. Application Data on May 6, 2021, provisional application No. 63/296,735, filed on Jan. 5, 2022.

(58) Field of Classification Search
USPC .......................................................... 370/329
See application file for complete search history.

(56) References Cited

U.S. PATENT DOCUMENTS

| | | | | |
|---|---|---|---|---|
| 2012/0300743 | A1* | 11/2012 | Kim ...................... | H04L 5/0053 370/329 |
| 2013/0195066 | A1* | 8/2013 | Lee .................... | H04W 72/0446 370/329 |
| 2015/0092723 | A1* | 4/2015 | Ahn ..................... | H04L 1/1893 370/329 |
| 2020/0228173 | A1* | 7/2020 | Ye ........................ | H04L 5/0055 |
| 2020/0313809 | A1* | 10/2020 | Park ..................... | H04L 1/1861 |
| 2021/0029731 | A1* | 1/2021 | Kundu ................ | H04W 74/004 |
| 2021/0218504 | A1* | 7/2021 | Wang ................... | H04L 1/1812 |
| 2022/0038244 | A1* | 2/2022 | Zhang .................. | H04L 1/1671 |
| 2022/0046678 | A1* | 2/2022 | Yang ................. | H04W 72/1273 |
| 2022/0140954 | A1* | 5/2022 | Kim ..................... | H04L 1/1861 370/329 |
| 2022/0322397 | A1* | 10/2022 | Liu .................. | H04W 72/1273 |
| 2022/0361208 | A1* | 11/2022 | Khoshnevisan ...... | H04W 72/21 |
| 2023/0096989 | A1* | 3/2023 | Lee ...................... | H04L 5/0055 370/329 |
| 2023/0189243 | A1* | 6/2023 | Li .......................... | H04W 4/06 370/329 |
| 2023/0224086 | A1* | 7/2023 | Lee ...................... | H04L 1/1812 370/329 |

OTHER PUBLICATIONS

3GPP TSG RAN WG1 Meeting #104-e, e-Meeting, Jan. 25-Feb. 5, 2021, R1-2100354, Source: CATT, Title: Discussion on group scheduling mechanism for RRC_CONNECTED UEs in MBS, Agenda item: 8.12.1. (Year: 2021).*

3GPP TSG RAN WG1 Meeting #104-e, e-Meeing, Jan. 25-Feb. 5, 2021, R1-2100354, Source: CATT, Title: Discussion on group scheduling mechanism for RRC_CONNECTED UEs in MSB, Agenda Item: 8.12.1. (Year: 2021).*

3GPP TSG RAN WG1 #104b-e, e-Meeting, Apr. 12-20, 2021, R1-2102901, Source: CMCC, Title: Discussion on reliability improvement, Agenda item: 8.12.2. (Year: 2021).*

3GPP TSG RAN WG1 #104-e, e-Meeting, Jan. 25-Feb. 5, 2021, R1-2100674, Source: Intel Corporation, Title: NR MBS Group Scheduling for RRC_CONNECTED UES, Agenda item: 8.12.1. (Year: 2021).*

3GPP TSG-RAN WG1 Meeting #104-e, eMeeting, Jan. 25-Feb. 5t, 2021, R1-2101726, Agenda item: 8.12.1, Source: Ericsson, Title: Mechanisms to support MBS group scheduling for RRC_CONNECTED UEs. (Year: 2021).*

Extended European Search Report issued Feb. 7, 2024 regarding Application No. 22754277.6, 11 pages.

CMCC, "Discussion on reliability improvement", 3GPP TSG RAN WG1 #104b-e, R1-2102901, Apr. 2021, 9 pages.

International Search Report and Written Opinion issued Jun. 17, 2022 regarding International Application No. PCT/KR2022/002886, 6 pages.

CATT, "Discussion on group scheduling mechanism for RRC_CONNECTED UEs in MBS", 3GPP TSG RAN WG1 Meeting #104-e, R1-2100354, Jan. 2021, 11 pages.

Intel Corporation, "NR MBS Group Scheduling for RRC_CONNECTED UEs", 3GPP TSG RAN WG1 #104-e, R1-2100674, Jan. 2021, 9 pages.

Ericsson, "Mechanisms to support MBS group scheduling for RRC_CONNECTED UEs", 3GPP TSG-RAN WG1 Meeting #104-e, R1-2101726, Jan. 2021, 15 pages.

"5G; NR; Physical channels and modulation (3GPP TS 38.211 version 16.5.0, Release 16)", ETSI TS 138 211 V16.5.0, Apr. 2021, 138 pgs.

"5G; NR; Multiplexing and channel coding (3GPP TS 38.212 version 16.5.0 Release 16)", ETSI TS 138 212 V16.5.0, Apr. 2021, 155 pages.

"5G; NR; Physical layer procedures for control (3GPP TS 38.213 version 16.5.0 Release 16)", ETSI TS 138 213 V16.5.0, Apr. 2021, 188 pages.

"5G; NR; Physical layer procedures for data (3GPP TS 38.214 version 16.5.0 Release 16)", ETSI TS 138 214 V16.5.0, Apr. 2021, 173 pages.

"5G; NR; Medium Access Control (MAC) protocol specification (3GPP TS 38.321 version 16.4.0 Release 16)", ETSI TS 138 321 V16.4.0, Apr. 2021, 159 pages.

"5G; NR; Radio Resource Control (RRC); Protocol specification (3GPP TS 38.331 version 16.4.1 Release 16)", ETSI TS 138 331 V16.4.1, Apr. 2021, 932 pages.

"5G; NR; Physical channels and modulation (3GPP TS 38.211 version 16.4.0 Release 16)", ETSI TS 138 211 V16.4.0, Jan. 2021, 137 pages.

"5G; NR; Multiplexing and channel coding (3GPP TS 38.212 version 16.4.0 Release 16)", ETSI TS 138 212 V16.4.0, Jan. 2021, 155 pages.

"5G; NR; Physical layer procedures for control (3GPP TS 38.213 version 16.4.0 Release 16)", ETSI TS 138 213 V16.4.0, Jan. 2021, 185 pages.

"5G; NR; Physical layer procedures for data (3GPP TS 38.214 version 16.4.0 Release 16)", ETSI TS 138 214 V16.4.0, Jan. 2021, 173 pages.

"5G; NR; Medium Access Control (MAC) protocol specification (3GPP TS 38.321 version 16.3.0 Release 16)", ETSI TS 138 321 V16.3.0, Jan. 2021, 158 pages.

"5G; NR; Radio Resource Control (RRC); Protocol specification (3GPP TS 38.331 version 16.3.1 Release 16)", ETSI TS 138 331 V16.3.1, Jan. 2021, 916 pages.

* cited by examiner

METHOD AND APPARATUS FOR DETERMINING RESOURCES FOR PUCCH TRANSMISSION WITH ACKNOWLEDGMENT INFORMATION

CROSS-REFERENCE TO RELATED APPLICATION AND CLAIM OF PRIORITY

This application claims priority under 35 U.S.C. § 119(e) to U.S. Provisional Patent Application No. 63/155,116 filed on Mar. 1, 2021; U.S. Provisional Patent Application No. 63/185,163 filed on May 6, 2021; and U.S. Provisional Patent Application No. 63/296,735 filed on Jan. 5, 2022. The above-identified provisional patent applications are hereby incorporated by reference in their entirety.

TECHNICAL FIELD

The present disclosure relates generally to wireless communication systems and, more specifically, the present disclosure relates to mechanisms for determining and multiplexing acknowledgment information and power and multiplexing procedures for transmission of multicast acknowledgment information.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to mechanisms for determining and multiplexing acknowledgment information and power and multiplexing procedures for transmission of multicast acknowledgment information.

In one embodiment, a method is provided. The method includes receiving: information for first resources for physical uplink control channel (PUCCH) transmissions to provide hybrid automatic repeat request acknowledgement (HARQ-ACK) information in response to semi-persistently scheduled (SPS) physical downlink shared channel (PDSCH) receptions associated with a first radio network temporary identifier (RNTI) from a first set of RNTIs, and information for second resources for PUCCH transmissions to provide HARQ-ACK information in response to SPS PDSCH receptions associated with a second RNTI from a second set of RNTIs. The method further includes determining a first resource from the first resources for a first PUCCH to provide only: first HARQ-ACK information in response to first SPS PDSCH receptions associated with the first RNTI, and second HARQ-ACK information in response to second SPS PDSCH receptions associated with the second RNTI; and transmitting the first PUCCH with the first and second HARQ-ACK information using the first resource.

In another embodiment, a user equipment (UE) is provided. The UE includes a transceiver configured to receive information for first resources for PUCCH transmissions to provide HARQ-ACK information in response to SPS PDSCH receptions associated with a first RNTI from a first set of RNTIs, and information for second resources for PUCCH transmissions to provide HARQ-ACK information in response to SPS PDSCH receptions associated with a second RNTI from a second set of RNTIs. The UE further includes a processor operably coupled to the transceiver. The processor is configured to determine a first resource from the first resources for a first PUCCH to provide only: first HARQ-ACK information in response to first SPS PDSCH receptions associated with the first RNTI, and second HARQ-ACK information in response to second SPS PDSCH receptions associated with the second RNTI. The transceiver is further configured to transmit with the first and second HARQ-ACK information the first PUCCH using the first resource.

In yet another embodiment, a base station is provided. The base station includes a transceiver configured to transmit information for first resources for PUCCH receptions that provide HARQ-ACK information in response to SPS PDSCH transmissions associated with a first RNTI from a first set of RNTIs, and information for second resources for PUCCH receptions that provide HARQ-ACK information in response to SPS PDSCH transmissions associated with a second RNTI from a second set of RNTIs. The base station further includes a processor operably coupled to the transceiver. The processor is configured to determine a first resource from the first resources for a first PUCCH that provides only: first HARQ-ACK information in response to first SPS PDSCH transmissions associated with the first RNTI, and second HARQ-ACK information in response to second SPS PDSCH transmissions associated with the second RNTI. The transceiver is further configured to receive the first PUCCH using the first resource.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C"

includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
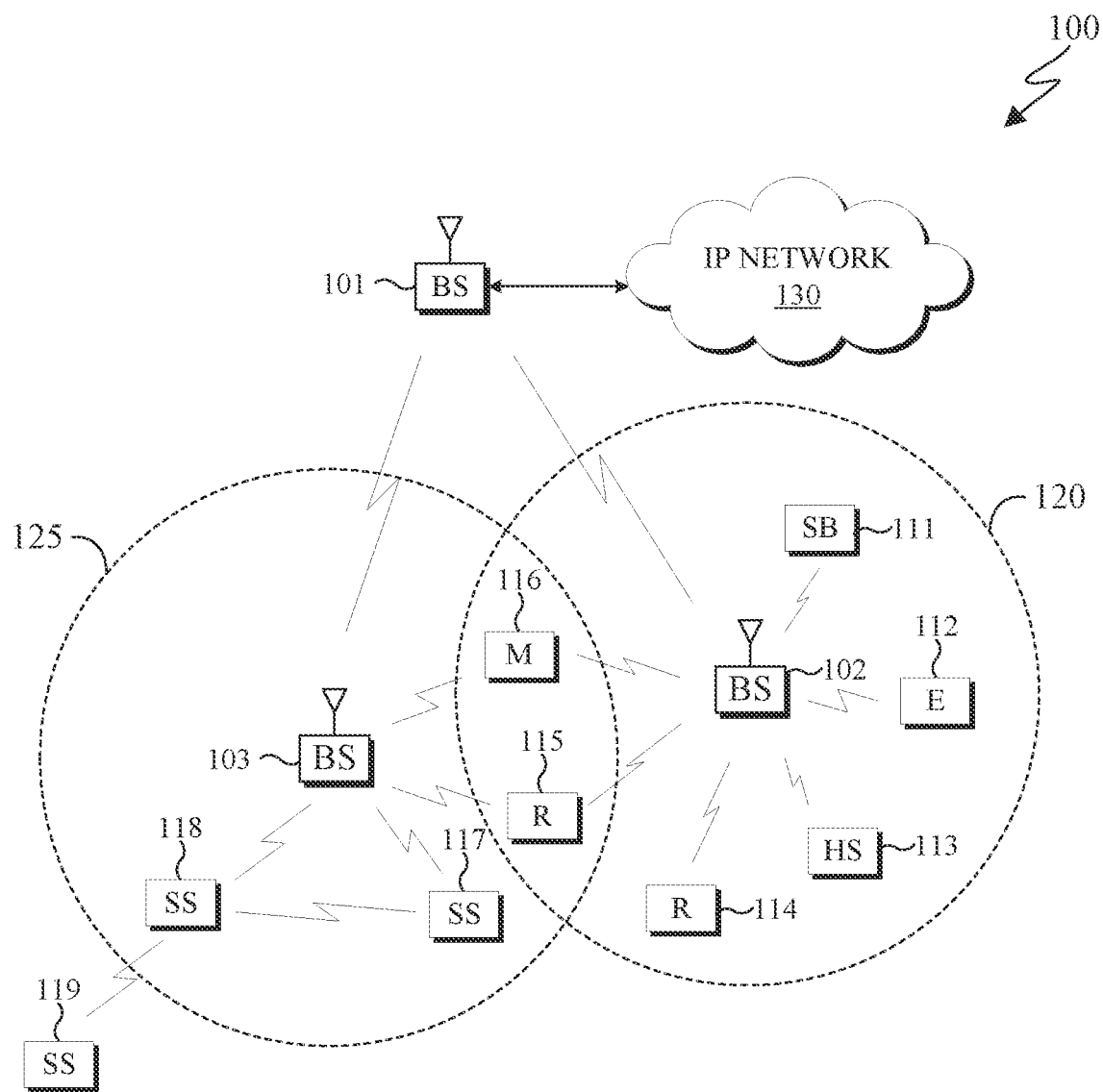
FIG. 1 illustrates an example wireless network according to embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.4.0 and v16.5.0, "NR; Physical channels and modulation" ("REF1"); 3GPP TS 38.212 v16.4.0 and v16.5.0, "NR; Multiplexing and Channel coding" ("REF2"); 3GPP TS 38.213 v16.4.0 and v16.5.0, "NR; Physical Layer Procedures for Control" ("REF3"); 3GPP TS 38.214 v16.4.0 and v16.5.0, "NR; Physical Layer Procedures for Data" ("REF4"); 3GPP TS 38.321 v16.3.1 and v16.4.0, "NR; Medium Access Control (MAC) protocol specification" ("REF5"); and 3GPP TS 38.331 v16.3.1 and v16.4.0, "NR; Radio Resource Control (RRC) Protocol Specification" ("REF6").

The present disclosure relates to determining and multiplexing hybrid automatic repeat request acknowledgement (HARQ-ACK) information in a physical uplink control channel (PUCCH) or in a physical uplink shared channel (PUSCH) from a user equipment (UE) to a base station. The present disclosure also relates to multiplexing unicast and multicast control information and to determining a power for a PUCCH transmission with multicast HARQ-ACK information from a UE to a base station.

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals.

Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

Figure 2:
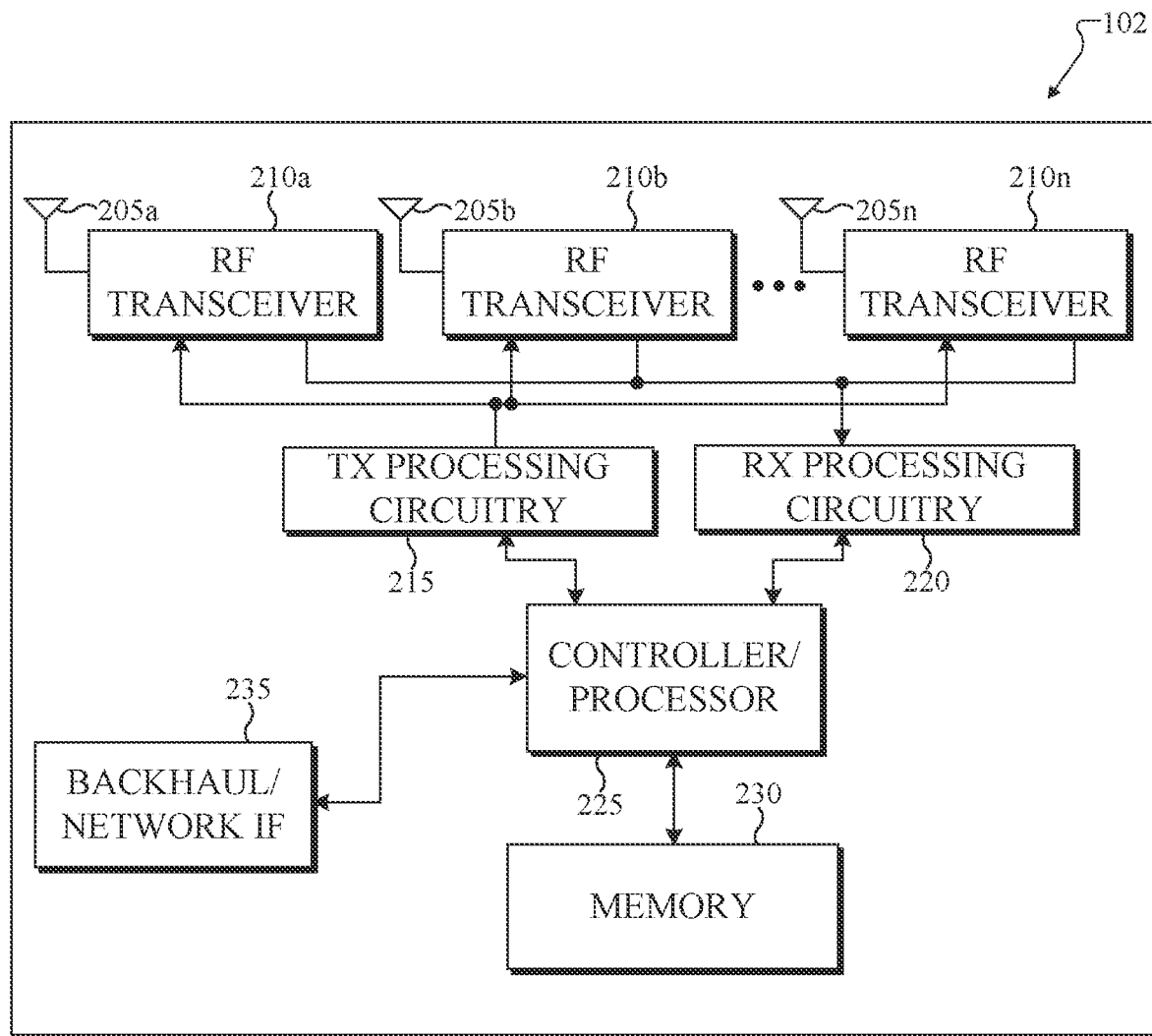
FIG. 2 illustrates an example base station (BS) according to embodiments of the present disclosure.
Figure 3:
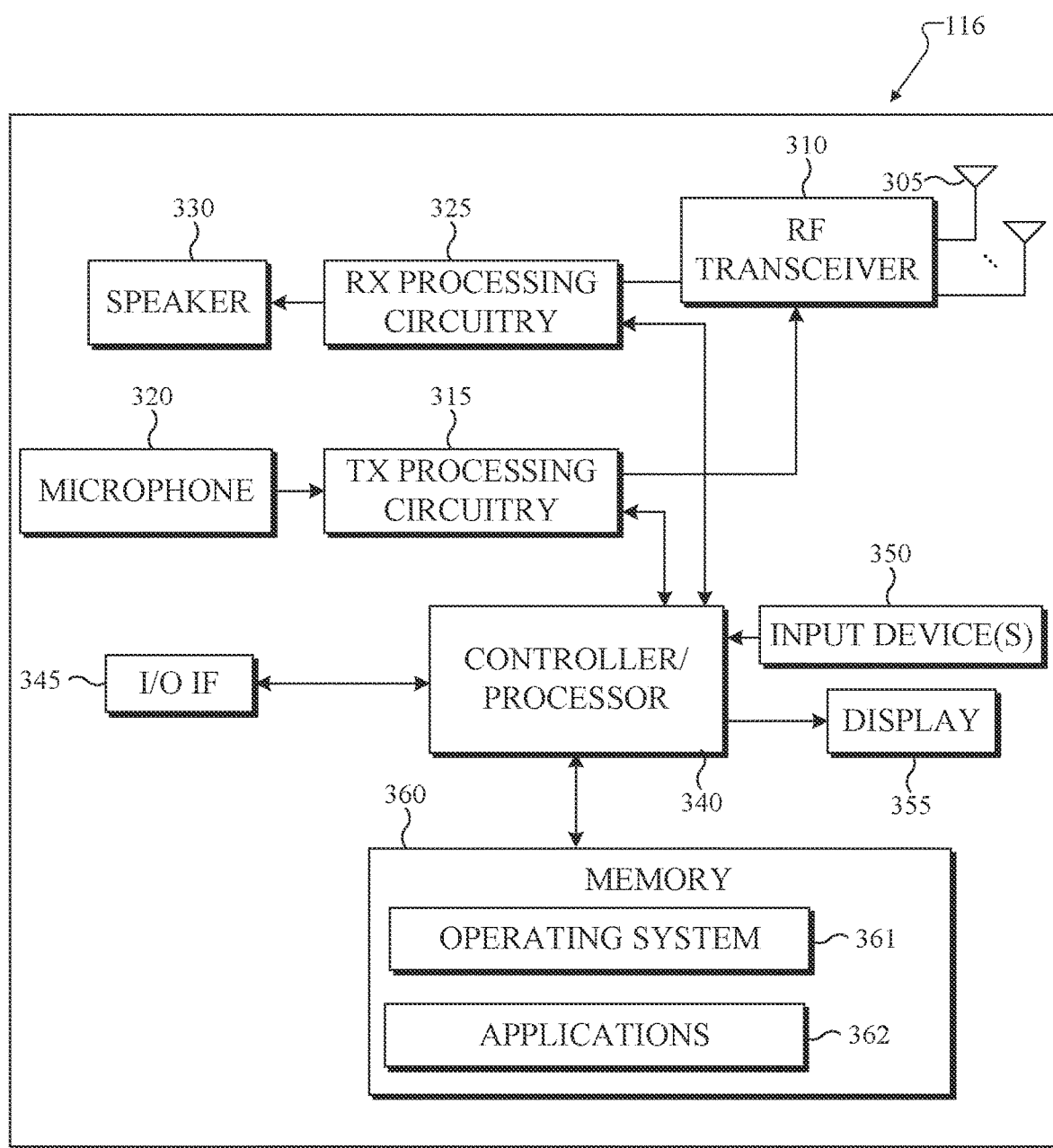
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes various gNodeB (bNG) such a base station, BS 101, a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115, the UE 116, the UE 117, and the UE 118. In some embodiments, one or more of the BSs 101-103 may communicate with each other and with the UEs 111-118 using 5G/NR, long term evolution (LTE), long term evolution-advanced (LTE-A), WiMAX, WiFi, or other wireless communication techniques.

In certain embodiments, multiple UEs (such as the UE 117, the UE 118, and the UE 119) may communicate directly with each other through device-2-device communication. In some embodiments, a UE, such as UE 119, is outside the coverage area of the network, but can communicate with other UEs inside the coverage area of the network, such as UE 118, or outside the coverage area of the network.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support the codebook design and structure for systems having 2D antenna arrays. Additionally, in some embodiments, one or more re of BS 101, BS 102 and BS 103 support mechanisms for determining and multiplexing acknowledgment information as well as power and multiplexing procedures for transmission of multicast acknowledgement information.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support mechanisms for determining and multiplexing acknowledgment information as well as power and multiplexing procedures for transmission of multicast acknowledgement information. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities. For example, the controller/processor 225 can move data into or out of the memory 230 according to a process that is being executed. For another example, the controller/processor 225 supports mechanisms for determining and multiplexing acknowledgment information as well as power and multiplexing procedures for transmission of multicast acknowledgement information.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of the BS 102 (implemented using the RF transceivers 210a-210n, TX processing circuitry 275, and/or RX processing circuitry 270) support communication with aggregation of frequency division duplex (FDD) cells and time division duplex (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

In the following, an italicized name for a parameter implies that the parameter is provided by higher layers.

Figure 4:
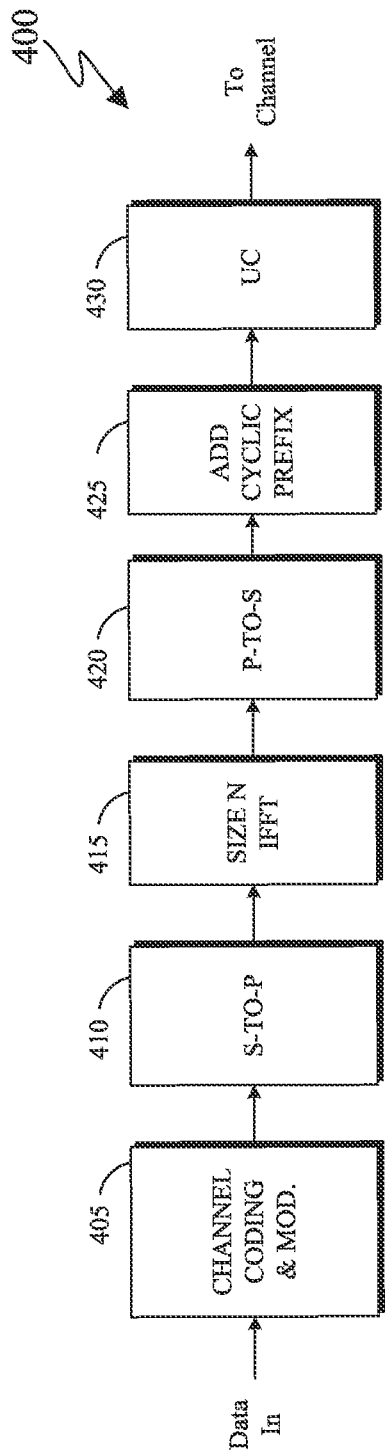
FIGS. 4 and 5 illustrate example wireless transmit and receive paths according to embodiments of the present disclosure.
Figure 5:
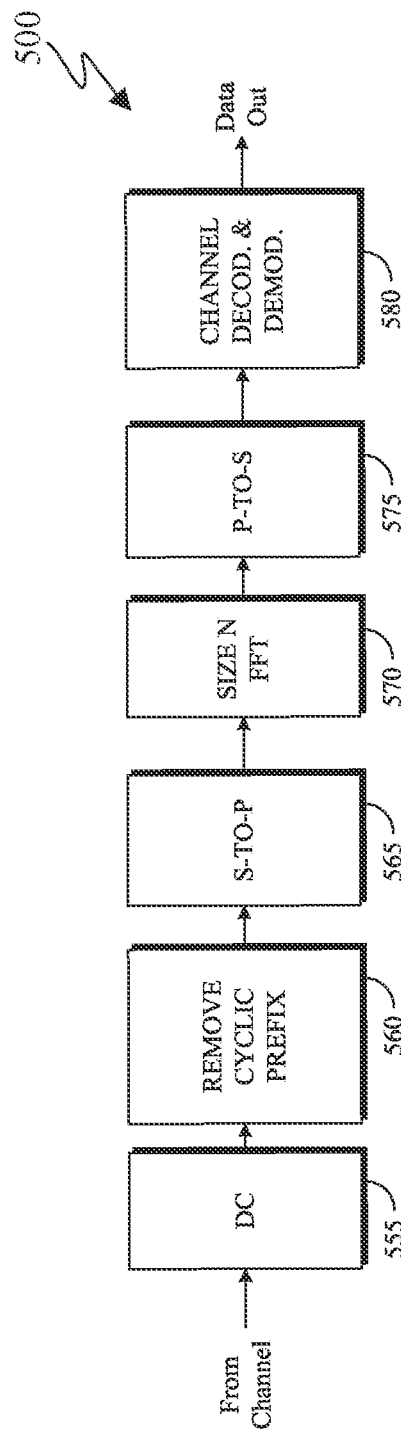

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support mechanisms for determining and multiplexing acknowledgment information as well as power and multiplexing procedures for transmission of multicast acknowledgement information as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serialto-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-118. Similarly, each of UEs 111-118 may implement the transmit path 400 for transmitting in the uplink to the BS s 101-103 and may implement the receive path 500 for receiving in the downlink from the BSs 101-103.

Furthermore, each of UEs 111-119 may implement a transmit path 400 for transmitting in the sidelink to another one of UEs 111-119 and may implement a receive path 500 for receiving in the sidelink from another one of UEs 111-119.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for downlink (DL) signaling or for uplink (UL) signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. A sub-carrier spacing (SCS) can be determined by a SCS configuration $\mu$ as $2^{\mu} \cdot 15$ kHz. A unit of one sub-carrier over one symbol is referred to as a resource element (RE). A unit of one RB over one symbol is referred to as a physical RB (PRB).

DL signals include data signals conveying information content, control signals conveying DL control information (DCI), reference signals (RS), and the like that are also known as pilot signals. A BS (such as the BS 102) transmits data information or DCI through respective physical DL shared channels (PDSCHs) or physical DL control channels (PDCCHs). A PDSCH or a PDCCH can be transmitted over a variable number of slot symbols including one slot symbol.

A PDSCH or a PDCCH can be transmitted over a variable number of slot symbols including one slot symbol. For example, a PDCCH transmission can be over a number of control channel elements (CCEs) from a predetermined set of numbers of CCEs referred to as CCE aggregation level.

For another example, a PDSCH transmission can be scheduled by a DCI format or is semi-persistently scheduled (SPS) as configured by higher layers and activated by a DCI format—see also REF3 through REF6. A PDSCH reception by a UE provides one or more transport blocks (TBs), wherein a TB is associated with a hybrid automatic repeat request (HARQ) process that is indicated by a HARQ process number field in a DCI format scheduling the PDSCH reception or activating a SPS PDSCH reception. A TB transmission for a HARQ process can be an initial one or a retransmission as identified by a new data indicator (NDI) field in the DCI format scheduling a PDSCH reception that provides a TB retransmission for a given HARQ process number—see also REF5.

In certain embodiments, a gNB (such as BS 102) transmits one or more of multiple types of RS including channel state information RS (CSI-RS) and demodulation RS (DMRS)—see also REF1.

A CSI-RS is primarily intended for UEs to perform measurements and provide channel state information (CSI) to a gNB. For channel measurement or for time tracking, non-zero power CSI-RS (NZP CSI-RS) resources are used. For interference measurement reports (IMRs), CSI interference measurement (CSI-IM) resources are used (see also REF5). The CSI-IM resources can also be associated with a zero power CSI-RS (ZP CSI-RS) configuration. A UE can determine CSI-RS reception parameters through DL control signaling or higher layer signaling, such as radio resource control (RRC) signaling from a gNB (see also REF5). A DMRS is typically transmitted only within a BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also REF1). A UE transmits data information or UCI through a respective physical UL shared channel (PUSCH) or a PUCCH. A PUSCH or a PUCCH can be transmitted over a variable number of symbols in a slot including one symbol. When a UE simultaneously transmits data information and UCI, the UE can multiplex both in a PUSCH or, depending on a UE capability, transmit both a PUSCH with data information and a PUCCH with UCI at least when the transmissions are on different cells.

UCI includes hybrid automatic repeat request acknowledgement (HARQ-ACK) information, indicating correct or incorrect decoding of transport blocks (TB s) or of code block groups (CBGs) in a PDSCH, scheduling request (SR) indicating whether a UE has data in its buffer to transmit, and CSI reports enabling a gNB to select appropriate parameters for PDSCH/TB or PDCCH/DCI format transmissions to a UE. A UE can transmit a PUCCH on a primary cell of a cell group. HARQ-ACK information is either a positive acknowledgement (ACK) when a TB decoding is correct or a negative acknowledgement (NACK) when a TB decoding is incorrect. An ACK can be represented by a binary '1' value and a NACK can be represented by a binary '0' value. A UE multiplexes HARQ-ACK information in a slot indicated by a value of PDSCH-to-HARQ_feedback timing indicator field in the DCI format, from a set of slot timing values $K_1$, or indicated by higher layers in case of a SPS PDSCH reception.

UL RS includes DMRS and SRS. DMRS is typically transmitted within a BW of a respective PUSCH or PUCCH. A gNB can use a DMRS to demodulate information in a respective PUSCH or PUCCH. SRS is transmitted by a UE to provide a gNB with an UL CSI and, for a TDD system, to also provide a precoding matrix indicator (PMI) for DL transmission. Further, as part of a random access procedure or for other purposes, a UE can transmit a physical random access channel (PRACH).

DL receptions and UL transmissions by a UE can be configured to occur in a corresponding DL bandwidth part (BWP) and UL BWP. A DL/UL BWP is smaller than or equal to a DL/UL bandwidth of a serving cell. In certain embodiments, Multicast (or groupcast) PDSCH receptions can occur in a common frequency region for a group of UEs, wherein the common frequency region is within an active DL BWP for each UE from the group of UEs. DL transmissions from a BS (such as the BS 102) and UL transmissions from a UE (such as the UE 116) can be based on an orthogonal frequency division multiplexing (OFDM) waveform including a variant using DFT preceding that is known as DFT-spread-OFDM (see also REF1). In the present disclosure, the terms 'groupcast' and 'multicast' are used interchangeable and have a same meaning.

Figure 6:
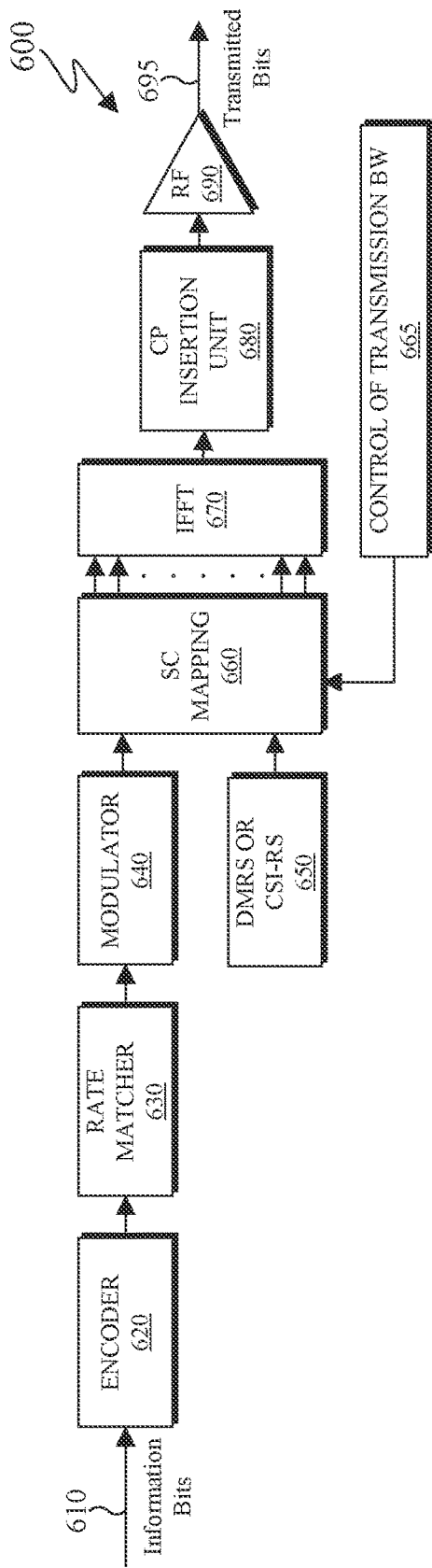
FIG. 6 illustrates a block diagram of an example transmitter structure using orthogonal frequency division multiplexing (OFDM) according to embodiments of the present disclosure.
Figure 7:
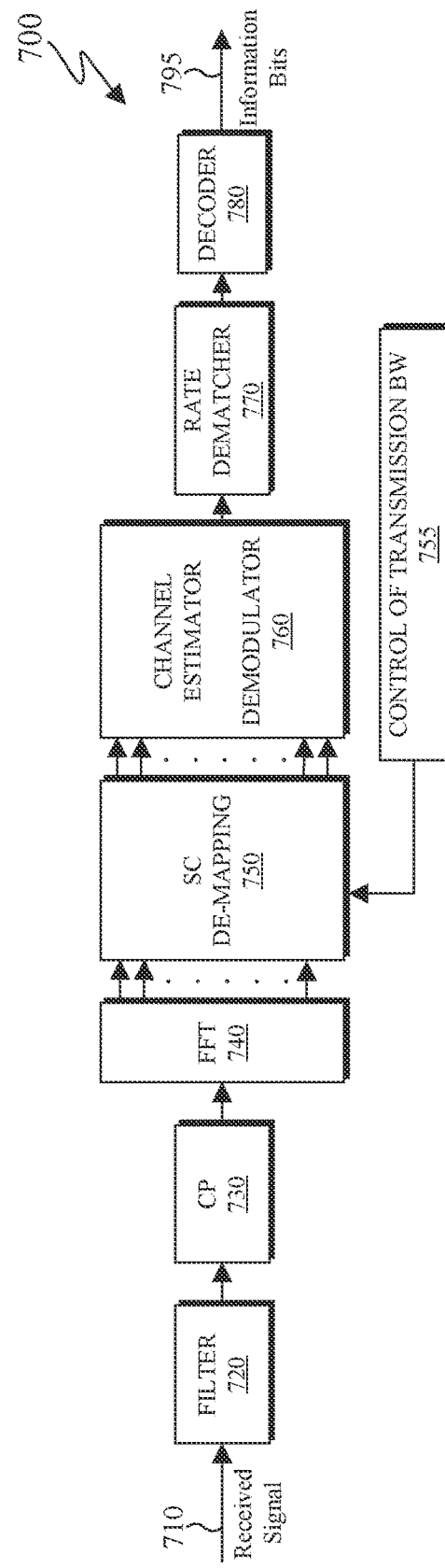
FIG. 7 illustrates a block diagram of an example receiver structure using OFDM according to embodiments of the present disclosure.

FIG. 6 illustrates a block diagram 600 of an example transmitter structure using OFDM according to embodiments of the present disclosure. FIG. 7 illustrates a block diagram 700 of an example receiver structure using OFDM according to embodiments of the present disclosure.

The transmitter structure as shown in the block diagram 600 and the receiver structure as shown in the block diagram 700 can be similar to the RF transceivers 210a-210n of FIG. 2 and the RF transceiver 310 of FIG. 3. The example block diagram 600 of FIG. 6 and the block diagram 700 of FIG. 7 are for illustration only and other embodiments can be used without departing from the scope of the present disclosure.

As illustrated in the block diagram 600, information bits 610, such as DCI bits or data bits, are encoded by encoder 620, rate matched to assigned time/frequency resources by rate matcher 630 and modulated by modulator 640. Subsequently, modulated encoded symbols and demodulation reference signal (DMRS) or CSI-RS 650 are mapped to SCs by SC mapping unit 660 with input from BW selector unit 665, an IFFT is performed by filter 670, a cyclic prefix (CP) is added by CP insertion unit 680, and a resulting signal is filtered by filter 690 and transmitted by a radio frequency (RF) unit as transmitted bits 695.

As illustrated in the block diagram 700, a received signal 710 is filtered by filter 720, a CP removal unit 730 removes a CP, a filter 740 applies a fast FFT, SCs de-mapping unit 750 de-maps SCs selected by BW selector unit 755, received symbols are demodulated by a channel estimator and a demodulator unit 760, a rate de-matcher 770 restores a rate matching, and a decoder 780 decodes the resulting bits to provide information bits 790.

In certain embodiments, a UE (such as the UE 116) reports report HARQ-ACK information in response to correct or incorrect detection of a DCI format together with HARQ-ACK information in response to correct of incorrect detection of TB s. For example, the HARQ-ACK information for a detection of a DCI format can be for a DCI format indicating an SPS PDSCH release or for a DCI format indicating a dormant/non-dormant BWP for a cell from a group of cells, and so on. A UE can also be configured to report HARQ-ACK information for a configured number of CBGs per TB as described in REF3. For brevity, unless explicitly otherwise mentioned, only HARQ-ACK information in response to correct or incorrect reception of TB s is subsequently considered but it should be understood that HARQ-ACK information can also be in response to additional reception outcomes. The HARQ-ACK information report can be based on one of several codebook types such as a Type-1 HARQ-ACK codebook or a Type-2 HARQ-ACK codebook or a Type-2 HARQ-ACK codebook as described in REF3. A UE can also report HARQ-ACK information only for SPS PDSCH receptions as described in REF3.

A serving gNB (such as BS 102) can provide, by higher layer signaling to a UE (such as the UE 116), a number of PUCCH resource sets for the UE to determine a PUCCH resource and a PUCCH resource from the PUCCH resource set for transmission of HARQ-ACK information as described in REF3. To enable flexible allocation of PUCCH resources, a PUCCH resource indicator field, with fixed or configurable size, can be included in a DCI format scheduling a PDSCH reception and a UE can then determine a PUCCH resource based on a value of the field. The UE determines a PUCCH resource based on a value of a PUCCH resource indicator field in a last DCI format that the UE correctly receives and generates corresponding HARQ-ACK information that is included in a PUCCH transmission using the PUCCH resource. The last DCI format is provided by a PDCCH reception that starts after all other PDCCH receptions providing DCI formats with corresponding HARQ-ACK information multiplexed in a same PUCCH—see also REF3. In case of multiple PDCCH receptions that start at a same symbol and provide DCI formats scheduling PDSCH receptions on respective multiple cells, the last PDCCH reception is the one corresponding to a cell from the multiple cells with a largest cell index. In case the DCI formats indicate a priority for the HARQ-ACK information, the last DCI format is among DCI formats indicating a same priority. When a UE provides HARQ-ACK only for SPS PDSCH receptions, the UE determines a resource for a PUCCH transmission with the HARQ-ACK information from one or more resources provided by higher layers, as described in REF3 and REF6.

In certain embodiments, a UE (such as the UE 116) determines a PUCCH transmission power $P_{PUCCH,b,f,c}$ on an active UL BWP b of carrier f in a cell c using PUCCH power control adjustment state with index l as described in Equation (1).

$$P_{PUCCH,b,f,c} = \min\left\{ \begin{array}{l} P_{CMAX,f,c} \\ P_{O_{PUCCH},b,f,c} + 10\log_{10}(2^{\mu} \cdot M_{RB,b,f,c}^{PUCCH}) + PL_{b,f,c} + \Delta_{F_{PUCCH}} + \Delta_{TF,b,f,c} + g_{b,f,c} \end{array} \right\} \text{[dBm]}$$

(1)

It is noted that the corresponding parameters of Equation (1) are described in detail in REF3. For example, $P_{CMAX,f,c}$ is a maximum transmission power, $P_{O\_PUCCH,b,f,c}$ is a nominal received power, μ is a sub-carrier spacing (SCS) configuration with μ=0 corresponding to 15 kHz, $M_{RB,b,f,c}^{PUCCH}$ is a number of RBs for the PUCCH transmission, $PL_{b,f,c}$ is a measured path-loss, $\Delta_{F\_PUCCH}$ depends on several parameters for the PUCCH transmission including a PUCCH format, $\Delta_{TF,b,f,c}$ provides an adjustment according to a spectral efficiency, and $g_{b,f,c}$ is a closed-loop power control (CLPC) state based on transmit power control (TPC) command values the UE receives in DCI formats.

Equation (2), below, describers when Reed-Mueller coding is used, or a number of UCI bits smaller than or equal to eleven.

$$\Delta_{TF,b,f,c} = 10 \log_{10}(K_1 \cdot (n_{HARQ-ACK} + O_{SR} + O_{CSI})/N_{RE}) \quad (2)$$

Here $K_1=6$. The expression $n_{HARQ-ACK}$ is a number of HARQ-ACK information bits that the UE determines for Type-1 HARQ-ACK codebook or for a Type-2 HARQ-ACK codebook, $O_{SR}$ is a number of SR information bits, and $O_{CSI}$ is a number of CSI information bits.

Equation (3) describes when a number of HARQ-ACK information bits is 1 or 2 and a PUCCH format 0, or a PUCCH format 1 using binary phase shift keying (BPSK) or QPSK modulation is used.

$$\Delta_{TF,b,f,c} = 10\log_{10}\left(\frac{N_{ref}^{PUCCH}}{N_{symb}^{PUCCH}}\right) + \Delta_{UCI} \quad (3)$$

Here $N_{symb}^{PUCCH}$ is a number of PUCCH format 0 symbols or PUCCH format 1 symbols $N_{ref}^{PUCCH}=2$ for PUCCH format 0, $N_{ref}^{PUCCH}=N_{symb}^{slot}$ or PUCCH format 1, $O_{UCI}=0$ for PUCCH format 0, and $\Delta_{UCI}=10 \log_{10}(O_{UCI})$ for PUCCH format 1 where $O_{UCI}$ is a number of UCI bits.

In certain embodiments, when a UE provides HARQ-ACK information according to a Type-1 HARQ-ACK codebook over $N_{cells}^{DL}$ cells is described in Equation (4.1), below.

$$n_{HARQ-ACK} = \quad (4)$$
$$\sum_{c=0}^{N_{cells}^{DL}-1} \sum_{m=0}^{M_c-1} N_{m,c}^{received} + \sum_{c=0}^{N_{cells}^{DL}-1} \sum_{m=0}^{M_c-1} N_{m,c}^{received,CBG}$$

Here $M_c$ is a total number of occasions for PDSCH reception or SPS PDSCH release is a set $M_{A,c}$ of occasions for PDSCH reception or SPS PDSCH release for serving cell c. The expression $N_{m,c}^{received}$ is a number of TBs the UE receives in PDSCH reception occasion m for serving cell c if the UE does not apply HARQ-ACK spatial domain bundling, or a number of PDSCH receptions if the UE applies HARQ-ACK spatial domain bundling, or a SPS PDSCH release in PDSCH reception occasion m for serving cell c. Additionally, the expression $N_{m,c}^{received,CBG}$ is a number of CBGs the UE receives in a PDSCH reception occasion m for serving cell c.

When a UE (such as the UE 116) provides HARQ-ACK information according to a Type-2 HARQ-ACK codebook, $n_{HARQ-ACK}$ is described in Equation (5), below. The expression $n_{HARQ-ACK,TB}$ of Equation (5) is described in Equation (6), and the expression $n_{HARQ-ACK,CBG}$ of Equation (5) is described in Equation (7), below.

$$n_{HARQ-ACK} = n_{HARQ-ACK,TB} + n_{HARQ-ACK,CBG} \quad (5)$$

$$n_{HARQ-ACK,TB} = \left(\left(V_{DAI,m_{last}}^{DL} - \sum_{c=0}^{N_{cells}^{DL}-1} U_{DAI,c}\right) \bmod (T_D)\right) N_{TB,max}^{DL} + \quad (6)$$
$$\sum_{c=0}^{N_{cells}^{DL}-1} \left(\sum_{m=0}^{M-1} N_{m,c}^{received} + N_{SPS,c}\right)$$

$$n_{HARQ-ACK,CBG} = \quad (7)$$
$$\left(\left(V_{DAI,m_{last}}^{DL} - \sum_{c=0}^{N_{cells}^{DL,CBG}-1} U_{DAI,c}^{CBG}\right) \bmod (T_D)\right) N_{HARQ-ACK,max}^{CBG/TB,max} +$$
$$\sum_{c=0}^{N_{cells}^{DL}-1} \sum_{m=0}^{M-1} N_{m,c}^{received,CBG}$$

Here, $T_D=2^{N_{C-DAI}^{DL}}$ where $N_{C-DAI}^{DL}$ m is a number of bits for a counter DAI field.

As described in Equation (6), if $N_{cells}^{DL}=1$, tgeb $V_{DAI,m_{last}}^{DL}$ is a value of a counter DAI field in a last DCI format scheduling PDSCH reception or indicating SPS PDSCH release or indicating SCell dormancy, for any serving cell c that the UE detects within the M PDCCH monitoring occasions wherein M is the cardinality of a set of PDCCH monitoring occasions associated with the Type-2 HARQ-ACK codebook.

As described in Equation (6), if $N_{cells}^{DL}>1$ and if the UE does not detect any DCI format that includes a total DAI field in a last PDCCH monitoring occasion within the M PDCCH monitoring occasions (M is the cardinality of a set of PDCCH monitoring occasions associated with the Type-2 HARQ-ACK codebook) where the UE detects at least one DCI format scheduling PDSCH reception, indicating SPS PDSCH release or indicating SCell dormancy for any serving cell c, $V_{DAI,m_{last}}^{DL}$ is the value of a counter DAI field in a last DCI format the UE detects in the last PDCCH monitoring occasion.

Alternatively, as described in Equation (6), if $D_{cells}^{DL}>1$ and if the UE detects at least one DCI format that includes a total DAI field in a last PDCCH monitoring occasion within the M PDCCH monitoring occasions where the UE detects at least one DCI format scheduling PDSCH reception, indicating SPS PDSCH release or indicating SCell dormancy for any serving cell c, $V_{DAI,m_{last}}^{DL}$ a value of the total DAI field in the at least one DCI format that includes a total DAI field.

As described in Equation (6), if $V_{DAI,m_{last}}^{DL}=0$ and if the UE does not detect any DCI format scheduling PDSCH reception, indicating SPS PDSCH release or indicating SCell dormancy for any serving cell c in any of the M PDCCH monitoring occasions.

As described in Equation (6), $U_{DAI,c}$ is a total number of DCI formats scheduling PDSCH reception, indicating SPS PDSCH release or indicating SCell dormancy that the UE detects within the M PDCCH monitoring occasions for serving cell c. $U_{DAI,c}=0$ if the UE does not detect any DCI format scheduling PDSCH reception, indicating SPS PDSCH release or indicating SCell dormancy for serving cell c in any of the M PDCCH monitoring occasions.

As described in Equation (6), $N_{TB,max}^{DL}=2$ if a maximum number of TBs that can be provided in a PDSCH reception is 2 for any serving cell c and the UE does not apply HARQ-ACK spatial domain bundling; otherwise, $N_{TB,max}^{DL}=1$.

As described in Equation (6), $N_{m,c}^{received}$ is a number of TBs the UE receives in a PDSCH scheduled by a DCI format that the UE detects in PDCCH monitoring occasion m for serving cell c if the UE does not apply HARQ-ACK spatial domain bundling, or a number of PDSCHs scheduled by a DCI format that the UE detects in PDCCH monitoring occasion m for serving cell c if the UE applies HARQ-ACK spatial domain bundling, or a number of DCI formats that the UE detects and indicate SPS PDSCH release in PDCCH monitoring occasion m for serving cell c, or a number of DCI formats that the UE detects and indicate SCell dormancy in PDCCH monitoring occasion m for serving cell c.

As described in Equation (6), $N_{SPS,c}$ is the number of SPS PDSCH receptions by the UE on serving cell c for which the UE transmits corresponding HARQ-ACK information in the same PUCCH as for HARQ-ACK information corresponding to PDSCH receptions within the M PDCCH monitoring occasions.

The components of Equation (7) are similar as for $n_{HARQ\text{-}ACK,TB}$, of Equation (6), and a corresponding description is provided in REF3.

In certain embodiments, a UE (such as the UE 116) monitors multiple candidate locations for respective potential PDCCH receptions to decode multiple DCI formats in a slot, according to respective search space sets. A DCI format includes cyclic redundancy check (CRC) bits in order for the UE to confirm a correct detection of the DCI format. A DCI format type is identified by a radio network temporary identifier (RNTI) that scrambles the CRC bits (See REF2).

For a DCI format scheduling a PDSCH or a PUSCH to a single UE (such as the UE 116), the RNTI can be (i) a cell RNTI (C-RNTI), (ii) a configured scheduling RNTI (CS-RNTI), or (iii) a modulation and coding scheme (MCS)-C-RNTI and serves as a UE identifier. In the following, for brevity, only the C-RNTI is often referred to for brevity. A UE can receive/monitor PDCCH for detections of DCI formats with CRC scrambled by a C-RNTI according to a UE-specific search space (USS). For DCI format 0_0 and DCI format 1_0 that schedule PUSCH transmissions and PDSCH receptions, respectively, to a UE, the UE can additionally be configured to monitor corresponding PDCCH according to common search space (CSS).

For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format scheduling a PDSCH providing paging information, the RNTI can be a P-RNTI. A UE monitors PDCCH for these DCI formats according to a corresponding CSS on a primary cell. There are also a number of other RNTIs provided to a UE by UE-specific RRC signaling and are associated with DCI formats providing various control information and have corresponding PDCCHs that a UE monitors according to a Type-3 CSS on the primary cell or on a secondary cell. Such DCI formats include a DCI format 2_0 providing a structure of a slot in term of DL, UL or flexible/reserved symbols over a number of slots, a DCI format 2_2 providing TPC commands for PUSCH or PUCCH transmissions, a DCI format 2_3 providing TPC commands for SRS transmissions and also potentially triggering a SRS transmission on a number of cells, and so on, and a corresponding CSS is referred to as Type-3-PDCCH CSS.

A PDSCH reception can be only by a single UE and is then referred to as unicast PDSCH reception or can be by a group of UEs and is then referred to as multicast (or groupcast) PDSCH reception. The determination can be based on a RNTI used to scramble a CRC of a DCI format scheduling the PDSCH reception or activating SPS PDSCH receptions. For unicast PDSCH receptions, the RNTI can be (i) a C-RNTI, (ii) a CS-RNTI, or (iii) an MCS-C-RNTI. For multicast PDSCH receptions, the RNTI can be (i) a group RNTI (G-RNTI) or (ii) a G-CS-RNTI. HARQ-ACK information in response to unicast PDSCH receptions or in response to DCI formats with CRC scrambled by C-RNTI, CS-RNTI, or MCS-C-RNTI is referred to as unicast HARQ-ACK information and, together with SR or CSI, can be referred to as unicast UCI. HARQ-ACK information in response to multicast PDSCH receptions or in response to DCI formats with CRC scrambled by G-RNTI, G-CS-RNTI is referred to as multicast HARQ-ACK information.

A UE can be configured to receive both unicast PDSCH and multicast PDSCH. The UE can identify whether a PDSCH reception is a unicast one or a multicast on based on the DCI format scheduling the PDSCH reception or based on a configuration by higher layers when the PDSCH reception is not scheduled by a DCI format. For example, a DCI format with CRC scrambled by a first RNTI, such as a C-RNTI, or having a field indicating a first PDSCH type, such as unicast PDSCH, can be used to schedule a unicast PDSCH reception while a DCI format with CRC scrambled by a second RNTI, such as a G-RNTI, or having a field indicating a second PDSCH type, such as multicast PDSCH, can be used to schedule a multicast PDSCH reception. For example, a DCI format can include a service-type indicator field wherein a first value can indicate scheduling of a unicast PDSCH reception and a second value can indicate scheduling of a multicast PDSCH reception. For example, a first DCI format scheduling of unicast PDSCH reception can have a first size and a second value can indicate scheduling of a multicast PDSCH reception. For brevity, the following descriptions assume that a DCI format scheduling a multicast PDSCH reception uses a G-RNTI, is referred to as multicast DCI format, and can have for example a same size as a DCI format 1_0 or as a DCI format 1_2 as they are described in REF2.

In certain embodiments, in order to avoid a substantial increase in PUCCH overhead that would result when many or all UEs receiving a multicast PDSCH provide corresponding HARQ-ACK information in respective PUCCHs, a serving gNB (such as BS 102) can configure at least some UEs to transmit corresponding PUCCHs only when the UE incorrectly receive at least one TB in a corresponding multicast PDSCH. Such UEs can share a PUCCH resource and the serving gNB can perform energy detection to determine a PUCCH transmission and therefore determine incorrect reception of one or more TBs associated with the PUCCH resource. A PUCCH format 0, or a PUCCH format 1 where all symbols are unmodulated (or, equivalently, use BPSK modulation with a numeric bit value of 1) can be used for the PUCCH transmission and for the serving gNB to perform energy detection.

For a maximum of M TB receptions (a reception of 2 TBs is considered a single TB reception for the purposes of HARQ-ACK reporting when HARQ-ACK bundling applies), a number of possible combinations for one or more corresponding NACK values described in Equation (8). Equation (9) describes the expression $$\binom{M}{k}$$

of Equation (8).

$$\sum_{k=1}^{M} \binom{M}{k} \tag{8}$$

-continued $$\binom{M}{k} = \frac{M!}{k!(M-k)!}. \quad (9)$$

It is noted that the UE can configure a set of $$\Sigma_{k=1}^{M}\binom{M}{k}$$

PUCCH resources and select a resource from the set of resources for a PUCCH transmission according to a combination of corresponding TBs associated with NACK values (and with ACK values). For example, for a maximum of M=4 TBs for a UE to provide HARQ-ACK information when there is at least one incorrect TB reception, the UE can be provided a set of 15 PUCCH resources and the UE can select a PUCCH resource according to one of the 15 combinations for TBs with NACK values or ACK values. For example, the UE can select the first PUCCH resource to indicate incorrect reception for only the first TB, the second resource to indicate incorrect reception for only the second TB, and so on, select the fifth resource to indicate incorrect reception of the first and second TBs, and so on, and select the fifteenth resource to indicate incorrect reception of all 4 TBs. A procedure needs to be defined for a gNB to control a power of a PUCCH transmission from a UE that is in response to an incorrect TB reception and for the UE to determine the power of the PUCCH transmission for any combination of ACK or NACK values (number of HARQ-ACK information bits) that the UE indicates by selecting a corresponding PUCCH resource.

In certain embodiments, a UE (such as the UE 116) supports a predetermined number of HARQ processes, such as 16 HARQ processes. The number of supported HARQ processes can be a requirement or a capability that the UE reports to a serving gNB. When a UE is configured to receive both unicast PDSCH and groupcast PDSCH, a HARQ process for a corresponding TB can be associated either with a unicast PDSCH or with a groupcast PDSCH for a corresponding Type-2 HARQ-ACK codebook. When an initial reception of a TB is provided by a groupcast PDSCH reception by a UE, a subsequent reception of the TB can be provided either by a groupcast PDSCH reception or by a unicast PDSCH reception by the UE, for example when the UE reports a NACK value for the initial reception of the TB, and the UE can multiplex HARQ-ACK information for the subsequent reception of the TB in a HARQ-ACK codebook for groupcast PDSCH receptions or in a HARQ-ACK codebook for unicast PDSCH receptions, respectively. A gNB can disable a HARQ-ACK information report from a UE based on an indication by higher layers or based on an indication in a DCI format scheduling a corresponding PDSCH reception. The gNB can additionally disable a HARQ-ACK information report for a set of HARQ processes that the gNB can provide to the UE by higher layers.

A UE can be provided by higher layer a first information element PUCCH-Config providing parameters for a PUCCH transmission with unicast UCI, such as HARQ-ACK information, SR, or CSI, see also REF5 and REF6, and a second information element PUCCH-Config providing parameters for a PUCCH transmission with HARQ-ACK information (and possibly CSI) associated with a DCI format with CRC scrambled by a G-RNTI. When a UE receives both unicast PDSCH and multicast PDSCH, the UE needs to determine how to provide corresponding HARQ-ACK information. A first option is for the UE to determine separate HARQ-ACK codebooks for unicast PDSCH receptions and for multicast PDSCH receptions. The UE can then multiplex each of the HARQ-ACK codebooks in a separate corresponding PUCCH transmission, for example when the UE supports two PUCCH transmissions with HARQ-ACK information in a slot, or the UE can jointly or separately encode and multiplex the HARQ-ACK codebooks in a same PUCCH transmission. A second option is for the UE to determine a single HARQ-ACK codebook for unicast and for multicast PDSCH receptions. The second option is not generally possible for a Type-2 HARQ-ACK codebook as, unlike a value of a first DAI field in a DCI format scheduling a unicast PDSCH reception, a value of a second DAI field in a DCI format scheduling a multicast PDSCH reception cannot be specific to a UE and therefore the UE cannot determine a Type-2 HARQ-ACK codebook by jointly processing the values of the first and second DAI fields. For a Type-1 HARQ-ACK codebook, determining a single HARQ-ACK codebook for unicast PDSCH receptions and for multicast PDSCH receptions is possible.

In certain embodiments, a TPC command in the DCI format scheduling a PUCCH transmission with groupcast HARQ-ACK information does not provide meaningful functionality as it cannot differentiate among UEs while the PUCCH transmission is UE-specific. Further, when unicast HARQ-ACK information and multicast HARQ-ACK information are multiplexed in a same PUCCH, a transmission power for the PUCCH needs to be determined considering both the unicast and the multicast HARQ-ACK information.

In certain embodiments, a PUCCH transmission from a UE can be with a number of repetitions. The number of repetitions can be provided to the UE by higher layers or, when the PUCCH transmission includes HARQ-ACK information, it can be indicated to the UE by a field in a DCI format associated with the HARQ-ACK information. The field can be a separate field indicating the number of repetitions or can be another field, such as a PUCCH resource indication field, wherein a PUCCH resource also includes a number of repetitions. For a PUCCH transmission providing HARQ-ACK information for groupcast PDSCH receptions, an indication for the number of repetitions by the DCI formats scheduling the PDSCH receptions is not possible as the DCI formats can be received by more than one UEs and not all of the more than one UEs may need to transmit a PUCCH with repetitions.

A PUCCH resource indicator in a DCI format scheduling a groupcast PDSCH reception for reporting HARQ-ACK associated with the groupcast PDSCH reception is not necessary as it is constrained to indicate a PUCCH resource to multiple UEs and there is no material benefit for indicating to all such UEs to use, for example, the second or the seventh PUCCH resource in a PUCCH resource set. Absence of the PUCCH resource indicator in the DCI format offers some overhead reduction but another mechanism needs to be defined for a UE to determine the PUCCH resource.

Therefore, embodiments of the present disclosure take into consideration that there is a need to determine a PUCCH resource for HARQ-ACK transmission in response to groupcast PDSCH receptions.

Embodiments of the present disclosure also take into consideration that there is a need to determine multiplexing conditions in a PUSCH that is scheduled by a first DCI format for HARQ-ACK information in response to groupcast PDSCH receptions that are scheduled by DCI formats that the UE receives after the first DCI format.

Embodiments of the present disclosure further take into consideration that there is a need to determine a PUCCH resource and a Type-2 HARQ-ACK codebook when a UE receives DCI formats indicating disabling of associated HARQ-ACK information.

Accordingly embodiments of the present disclosure, such as those described in FIGS. 8-11, relate to determining a PUCCH resource for HARQ-ACK transmission in response to groupcast PDSCH receptions. Embodiments of the present disclosure also relate to determining multiplexing conditions in a PUSCH that is scheduled by a first DCI format for HARQ-ACK information in response to groupcast PDSCH receptions that are scheduled by DCI formats that the UE receives after the first DCI format. Embodiments of the present disclosure further relate to determining a PUCCH resource and a Type-2 HARQ-ACK codebook when a UE receives DCI formats indicating disabling of associated HARQ-ACK information.

In certain embodiments, PUCCH resources with PUCCH transmissions providing unicast UCI may overlap in a slot and may also overlap with a PUCCH resource for PUCCH transmission with multicast HARQ-ACK information in the slot. A UE procedure should be defined for the UE to resolve the overlapping of PUCCH resources and the procedure needs to consider the unicast UCI types and whether the multicast HARQ-ACK information includes ACK or NACK values or it provides a combination of ACK and NACK values based on a selected PUCCH resource and occurs only in case of at least of NACK value (at least one incorrect TB reception).

In case the UE transmits only one PUCCH with HARQ-ACK information in a slot, or in case a PUCCH with unicast HARQ-ACK information overlaps with a PUCCH with multicast HARQ-ACK information, a procedure needs to be defined for a UE to determine a PUCCH resource to use for a PUCCH transmission with multiplexed unicast and multicast HARQ-ACK information (and potentially SR or CSI). The procedure needs to be defined for when the HARQ-ACK information bits are associated with PDSCH receptions that are scheduled by DCI formats or are associated only with SPS PDSCH receptions. The procedure also needs to be defined for when the PDSCH receptions scheduled by DCI formats or the SPS PDSCH receptions are unicast or multicast.

Therefore, embodiments of the present disclosure take into consideration that there is a need to determine a power for a PUCCH transmission that indicate an incorrect reception for one or more TBs.

Embodiments of the present disclosure also take into consideration that there is a need to define procedures for a UE to resolve overlapping between a PUCCH transmission triggered by incorrect TB receptions and other PUCCH transmissions.

Embodiments of the present disclosure further take into consideration that there is a need to define procedures for a UE to determine a PUCCH resource for a PUCCH transmission with UCI corresponding to unicast or multicast SPS PDSCH receptions and unicast of multicast PDSCH receptions that are scheduled by DCI formats.

Accordingly embodiments of the present disclosure, such as those described in FIGS. 12-15, relate to determining a power for a PUCCH transmission that indicate an incorrect reception for one or more TBs. Embodiments of the present disclosure also relate to defining procedures for a UE to resolve overlapping between a PUCCH transmission triggered by incorrect TB receptions and other PUCCH transmissions. Embodiments of the present disclosure further relate to defining procedures for a UE to determine a PUCCH resource for a PUCCH transmission with UCI corresponding to unicast or multicast SPS PDSCH receptions and unicast of multicast PDSCH receptions that are scheduled by DCI formats.

HARQ-ACK information can be for PDSCH receptions scheduled by DCI formats, or for SPS PDSCH receptions, or for a SPS PDSCH release, or for detection of a DCI format that does not schedule a PDSCH reception or a PUSCH transmission and instead provides an indication for dormant/non-dormant active DL BWPs for the UE in a group of cells without scheduling a PDSCH reception.

In the following, unless otherwise mentioned, all UCI types are assumed to have a same priority. A UE (such as the UE 116) may or may not multiplex UCI types of different priorities in a PUCCH or PUSCH depending on a capability. When the UE does not multiplex UCI types of different priorities in a PUCCH or PUSCH, the UE transmits only the PUCCH or PUSCH providing the UCI type with the larger priority.

The term "higher layers" is used to denote control information that a UE is provided in a PDSCH reception, such as radio resource control (RRC) or a medium access control (MAC) control element (CE).

Embodiments of the present disclosure describe resource determination of PUCCH with HARQ-ACK corresponding to DCI formats with CRC scrambled by G-RNTI. This is described in the following examples and embodiments, such as those of FIG. 8. That is, embodiments of the disclosure consider a procedure for a UE to determine a PUCCH resource for a PUCCH transmission with HARQ-ACK information corresponding to PDSCH receptions scheduled by a DCI format with CRC scrambled by a G-RNTI (also referred to, for brevity, as multicast DCI format).

Figure 8:
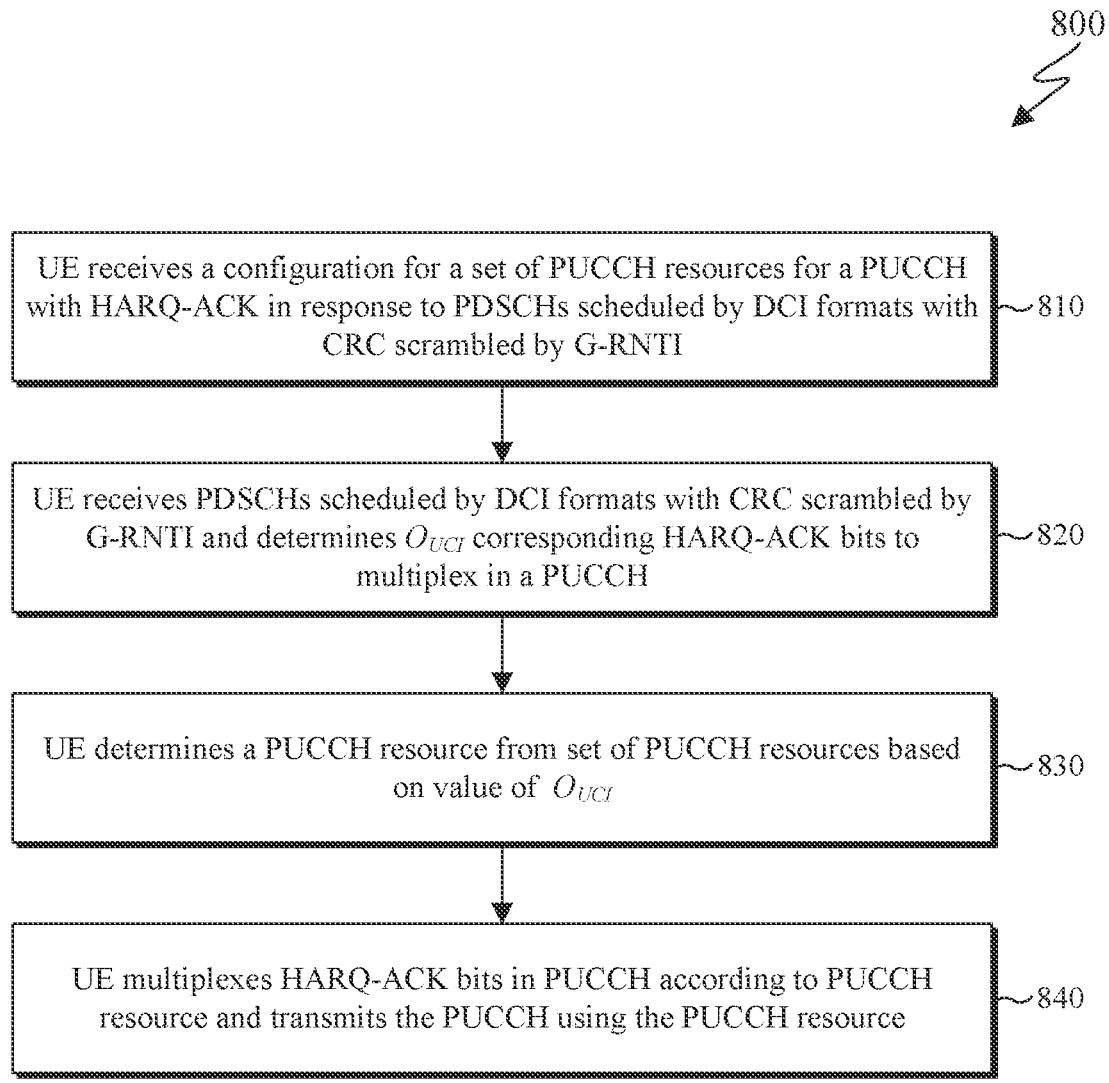
FIG. 8 illustrates an example method for determining a PUCCH resource for a PUCCH transmission with HARQ-ACK information according to embodiments of the present disclosure.

FIG. 8 illustrates an example method 800 for determining a PUCCH resource for a PUCCH transmission with HARQ-ACK information according to embodiments of the present disclosure.

The steps of the method 800 of FIG. 8 can be performed by any of the UEs 111-119 of FIG. 1, such as the UE 116 of FIG. 3. The method 800 is for illustration only and other embodiments can be used without departing from the scope of the present disclosure.

In certain embodiments, a UE (such as the UE 116) is provided by a higher layer parameter groupcast-PUCCH-AN-List (or mbs-PUCCH-AN-List or multicast-PUCCH-AN-List) a list of PUCCH resources, such as up to four PUCCH resources, for multiplexing HARQ-ACK information in response to PDSCH receptions that are scheduled by multicast DCI formats or for multicast SPS PDSCH receptions. A multicast DCI format may not include a PUCCH resource indicator field. Each PUCCH resource in the list of PUCCH resources has an index groupcast-PUCCH-AN-ResourceID. A UE can then determine a PUCCH resource to multiplex $O_{UCI}$ UCI bits as four options.

In a first option, the UE can determine a PUCCH resource to multiplex $O_{UCI}$ UCI bits as can then determine a PUCCH resource to multiplex $O_{UCI}$ bits as PUCCH resource provided by groupcast-PUCCH-AN-ResourceID obtained from the first entry in groupcast-PUCCH-AN-List if $O_{UCI} \leq 2$. Alternatively, the UE can then determine a PUCCH resource to multiplex $O_{UCI}$ UCI bits as a PUCCH resource provided by groupcast-PUCCH-AN-ResourceID obtained from the second entry in groupcast-PUCCH-AN-List, if provided, if $2 < O_{UCI} \leq N_{1,MBS}$ where $N_{1,MBS}$ is either provided by maxPayloadSize obtained from the second entry in groupcast-PUCCH-AN-List or is otherwise equal to 1706. Alternatively, the UE can then determine a PUCCH resource to multiplex $O_{UCI}$ UCI bits as a PUCCH resource provided by groupcast-PUCCH-AN-ResourceID obtained from the third entry in groupcast-PUCCH-AN-List, if provided, if $N_{1,MBS}<O_{UCI}\leq N_{2,MBS}$ where $N_{2,MBS}$ is either provided by maxPayloadSize obtained from the third entry in groupcast-PUCCH-AN-List or is otherwise equal to 1706. Alternatively, the UE can then determine a PUCCH resource to multiplex $O_{UCI}$ UCI bits as a PUCCH resource provided by groupcast-PUCCH-AN-ResourceID obtained from the fourth entry in groupcast-PUCCH-AN-List, if provided, if $N_{2,MBS}<O_{UCI}\leq N_{3,MBS}$ where $N_{3,MBS}$ is equal to 1706.

The method 800, as illustrated in FIG. 8 describes an example procedure for a UE to determine a PUCCH resource for a PUCCH transmission with HARQ-ACK information in response to PDSCH receptions scheduled by DCI formats with CRC scrambled by a G-RNTI according to embodiments of this disclosure.

In step 810, a UE (such as the UE 116) receives a configuration for a set of PUCCH resources to use for a PUCCH transmission with HARQ-ACK information in response to PDSCH receptions scheduled by DCI formats with CRC scrambled by a G-RNTI. A first/second (when any)/third (when any)/fourth (when any) PUCCH resource corresponds to a number of HARQ-ACK information bits that is respectively smaller than or equal 2, larger than 2 and smaller than or equal to $N_{1,MBS}$, larger than $N_{1,MBS}$ and smaller than or equal to $N_{2,MBS}$, and larger than $N_{2,MBS}$ and smaller than or equal to 1706. In step 820, the UE receives a number of PDSCHs scheduled by DCI formats with CRC scrambled by a G-RNTI and determines a number $O_{UCI}$ of corresponding HARQ-ACK information bits to multiplex in a PUCCH transmission. In step 830, the UE determines a PUCCH resource from the set of PUCCH resources based on the value of $O_{UCI}$. In step 840, the UE multiplexes the HARQ-ACK information bits in the PUCCH according to the PUCCH resource and transmits the PUCCH using the PUCCH resource.

In certain embodiments, when a UE (such as the UE 116) also multiplexes other UCI together with HARQ-ACK information in response to PDSCH receptions that are scheduled by a multicast DCI format in a PUCCH, the UE determines $O_{UCI}$ based on a total UCI payload. For example, when the UE multiplexes $O_{MBS}$ HARQ-ACK information in response to PDSCH receptions that are scheduled by DCI formats with CRC scrambled by a G-RNTI and multiplexes $O_{SPS}$ HARQ-ACK information bits in response to SPS PDSCH receptions, the UE can determine a PUCCH resource corresponding to $O_{UCI}=O_{MBS}+O_{SPS}$. The PUCCH resource can be a PUCCH resource configured for $O_{UCI}$ bits for SPS PDSCH receptions or a PUCCH resource configured for $O_{UCI}$ bits for PDSCH receptions scheduled by multicast DCI formats and the determination can be specified in the system operation of be configured by higher layers.

Although FIG. 8 illustrates the method 800 various changes may be made to FIG. 8. For example, while the method 800 is shown as a series of steps, various steps could overlap, occur in parallel, occur in a different order, or occur multiple times. In another example, steps may be omitted or replaced by other steps. For example, steps of the method 800 can be executed in a different order.

Embodiments of the present disclosure describe multiplexing HARQ-ACK information for groupcast PDSCH receptions. This is described in the following examples and embodiments, such as those of FIGS. 9-11. That is, embodiments of the disclosure considers procedures fora UE to multiplex HARQ-ACK information in a PUCCH or a PUSCH.

Figure 9:
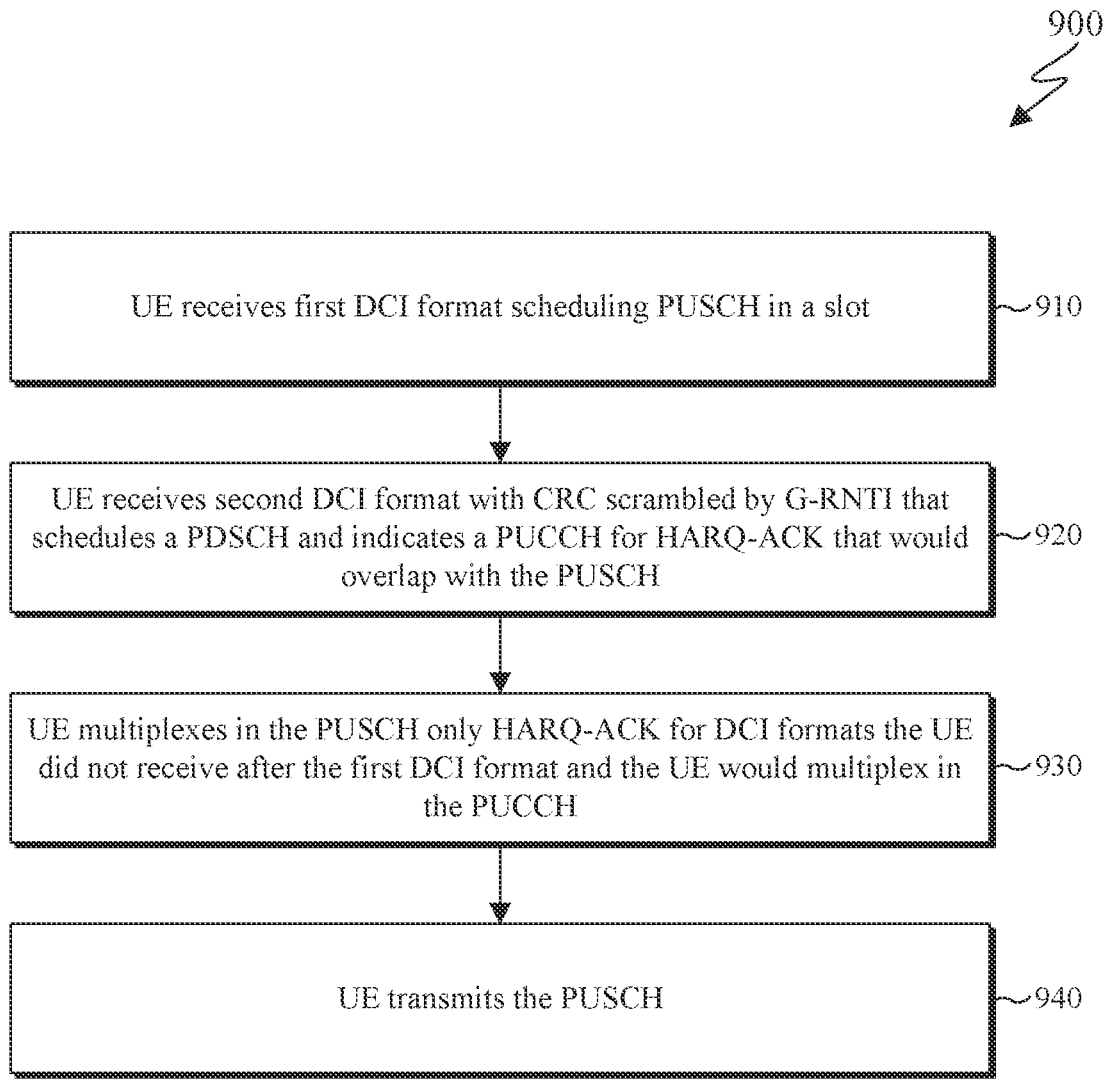
FIG. 9 illustrates an example method for multiplexing HARQ-ACK information in a physical uplink shared channel (PUSCH) transmission according to embodiments of the present disclosure.
Figure 10:
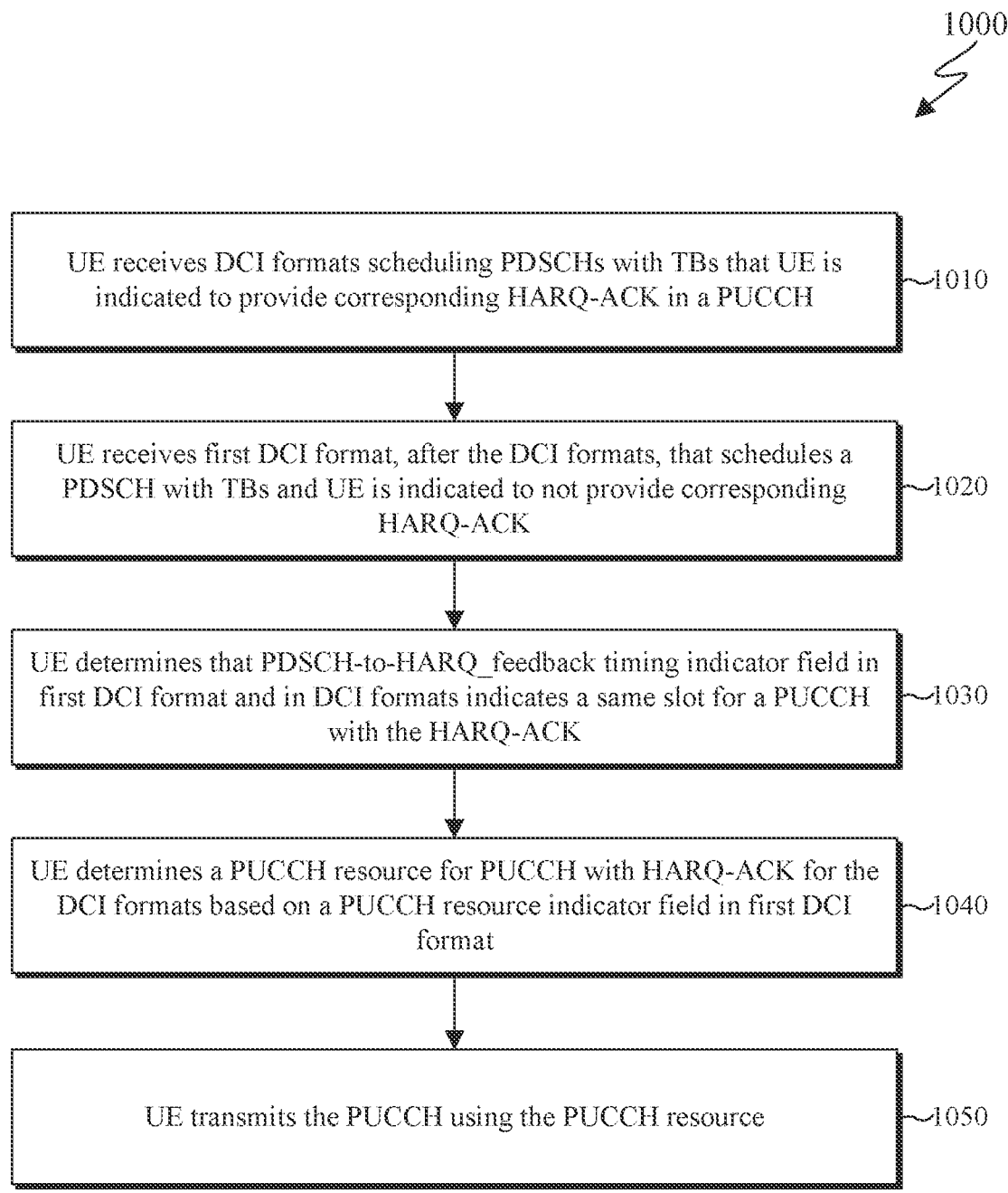
FIG. 10 illustrates an example method for determining a PUCCH resource for a PUCCH transmission with HARQ-ACK information according to embodiments of the present disclosure.
Figure 11:
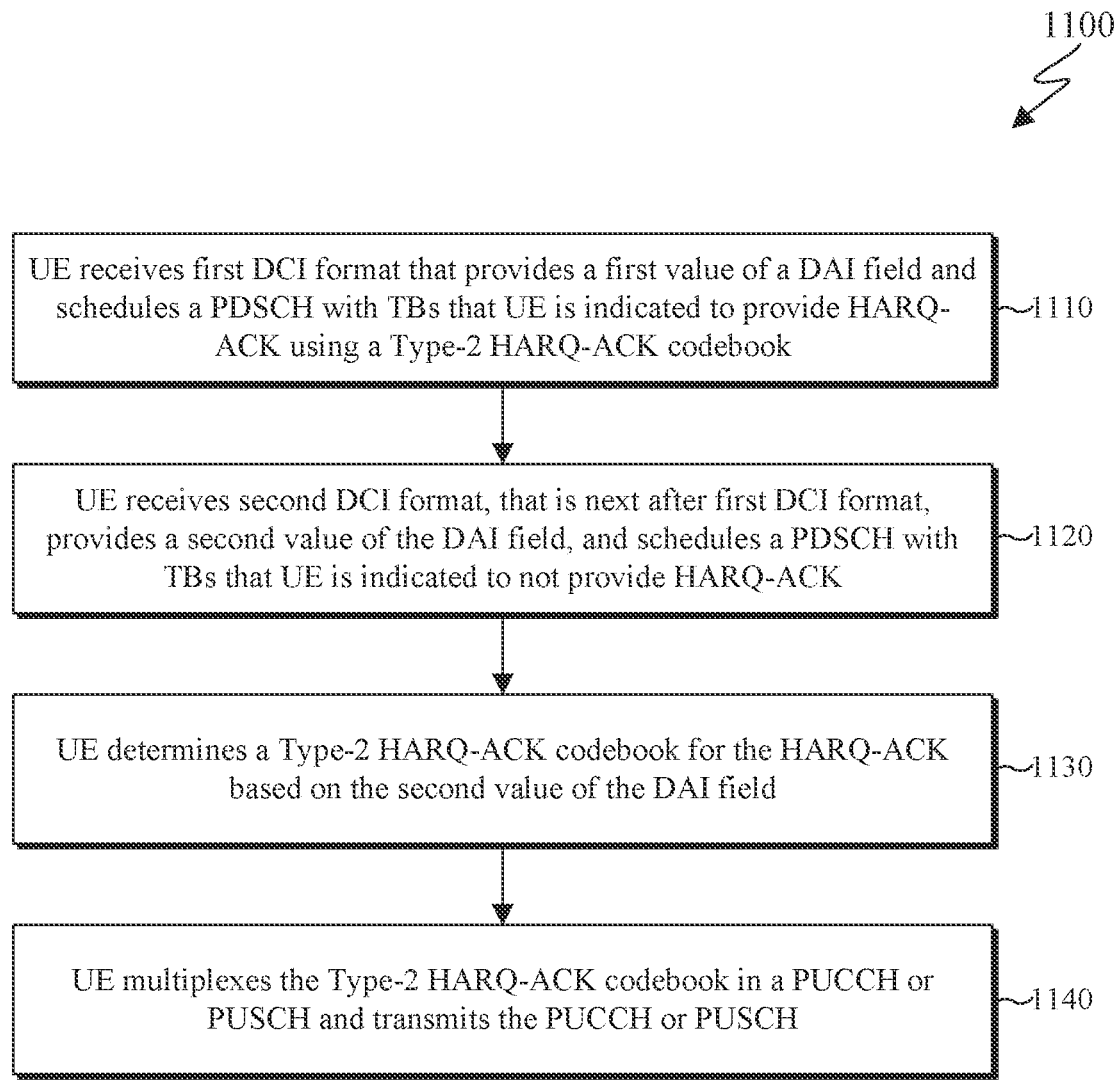
FIG. 11 illustrates an example method for determining a Type-2 HARQ-ACK codebook based on a value of a downlink assignment index (DAI) field in a downlink control information (DCI) format that indicates disabling of HARQ-ACK information associated with the DCI format according to embodiments of the present disclosure.

FIG. 9 illustrates an example method 900 for multiplexing HARQ-ACK information in a physical uplink shared channel (PUSCH) transmission according to embodiments of the present disclosure. FIG. 10 illustrates an example method 1000 for determining a PUCCH resource for a PUCCH transmission with HARQ-ACK information according to embodiments of the present disclosure. FIG. 11 illustrates an example method 1100 for determining a Type-2 HARQ-ACK codebook based on a value of a downlink assignment index (DAI) field in a downlink control information (DCI) format that indicates disabling of HARQ-ACK information associated with the DCI format according to embodiments of the present disclosure.

The steps of the method 900 of FIG. 9, the method 1000 of FIG. 10, and the method 1100 of FIG. 11 can be performed by any of the UEs 111-119 of FIG. 1, such as the UE 116 of FIG. 3. The methods 800-1100 are for illustration only and other embodiments can be used without departing from the scope of the present disclosure.

In certain embodiments, for unicast DCI formats receptions and PUSCH transmissions, a UE does not expect to detect a DCI format that is associated with generation of HARQ-ACK information by the UE and indicates a resource for a PUCCH transmission from the UE with the HARQ-ACK information in a slot if the UE previously detects a DCI format scheduling a PUSCH transmission in the slot and if the UE multiplexes HARQ-ACK information in the PUSCH transmission. Such a condition is beneficial as it can allow the UE to start multiplexing HARQ-ACK information in the PUSCH after the UE processes the DCI format scheduling the PUSCH transmission and not waiting until a minimum timeline for multiplexing HARQ-ACK information in the PUSCH prior to the PUSCH transmission. That minimum timeline depends on several conditions associated with the SCS of the PDCCHs providing DCI formats scheduling PDSCH receptions, the SCS of the PDSCH receptions, the SCS of overlapping PUSCH transmissions, whether the UE multiplexes CSI in a PUSCH transmission, and so on, as described in REF3.

Although the above condition can be satisfied for unicast DCI formats scheduling PDSCH receptions, SPS PDSCH release, or PUSCH transmission, it is not generally possible to satisfy for DCI formats scheduling groupcast PDSCH receptions (DCI formats with CRC scrambled by a G-RNTI). Particularly for unpaired spectrum (such as TDD) operation, it cannot be considered an error case that a UE detects a DCI format associated with generation of HARQ-ACK information by the UE and indicates a corresponding resource for a PUCCH transmission from the UE in a slot if the UE previously detects a DCI format scheduling a PUSCH transmission in the slot and if the UE would multiplex the HARQ-ACK information in the PUSCH. In such case, when the HARQ-ACK information is in response to a PDSCH reception scheduled by a DCI format with CRC scrambled by a G-RNTI, the UE behavior can be defined to be that the UE does not multiplex the HARQ-ACK information in the PUSCH and transmits the PUSCH. The UE multiplexes in the PUSCH any HARQ-ACK information that the UE would multiplex in a PUCCH that overlaps with the PUSCH in a slot and corresponds to DCI formats that the UE did not receive after the reception of the DCI format scheduling the PUSCH transmission.

Alternatively, the UE can indicate a capability for multiplexing HARQ-ACK information in a PUSCH when corresponding timeline conditions are satisfied, wherein the HARQ-ACK information is associated with DCI formats that the UE receives after a DCI format scheduling the PUSCH transmission.

The method 900 of FIG. 9 illustrates an example procedure for a UE to multiplex HARQ-ACK information in a PUSCH transmission according to embodiments of this disclosure.

In step 910, a UE (such as the UE 116) receives a first DCI format scheduling a PUSCH transmission in a slot. In step 920, the UE subsequently receives a second DCI format with CRC scrambled by a G-RNTI that schedules a PDSCH reception and indicates a PUCCH transmission with corresponding HARQ-ACK information in the slot, wherein the PUCCH transmission would overlap with the PUSCH transmission. In step 930, UE multiplexes in the PUSCH only HARQ-ACK information that the UE would multiplex in the PUCCH and corresponds to DCI formats that the UE did not receive after the first DCI format. In step 940, the UE does not multiplex the HARQ-ACK information associated with the second DCI format in the PUSCH even when timeline conditions for such multiplexing are satisfied. The UE transmits the PUSCH.

In certain embodiments, a UE can be indicated by higher layers a set of HARQ process numbers for PDSCH receptions on a cell that the UE does not provide HARQ-ACK information in response to corresponding TB decoding outcomes. A UE can also be indicated by a DCI format scheduling a PDSCH reception to not provide HARQ-ACK information in response to corresponding TB decoding outcomes, for example by an explicit binary field in the DCI format or by a reserved value of a PUCCH resource field or of a PDSCH-to-HARQ_feedback timing indicator field in the DCI format.

A UE can use a first value of a PUCCH resource indicator field in a first DCI format scheduling a PDSCH reception with TBs that the UE is indicated to not provide corresponding HARQ-ACK information to determine a PUCCH resource for a PUCCH transmission with HARQ-ACK information associated with previous DCI formats that the UE received and the UE was indicated to provide corresponding HARQ-ACK information when a value of a PDSCH-to-HARQ_feedback timing indicator field in the first DCI format and in the previous DCI formats indicates a same slot for a PUCCH transmission with the HARQ-ACK information.

The method 1000 of FIG. 10 illustrates an example procedure for a UE to determine a PUCCH resource for a PUCCH transmission with HARQ-ACK information based on a PUCCH resource indicator field in a DCI format that indicates disabling of HARQ-ACK information associated with the DCI format according to embodiments this disclosure.

In step 1010, a UE (such as the UE 116) receives DCI formats scheduling PDSCH receptions with TBs that the UE is indicated to provide corresponding HARQ-ACK information in a PUCCH. In step 1020, the UE receives a first DCI format, after the DCI formats, that schedules a PDSCH reception with TBs that the UE is indicated to not provide corresponding HARQ-ACK information. In step 1030, the UE determines that values of a PDSCH-to-HARQ_feedback timing indicator field, in the first DCI format and in the DCI formats, indicate a same slot for a PUCCH transmission with the HARQ-ACK information. In step 1040, the UE determines a PUCCH resource for a PUCCH transmission with HARQ-ACK information associated with the DCI formats based on a value of a PUCCH resource indicator field in the first DCI format. In step 1050, the UE transmits the PUCCH using the PUCCH resource.

In certain embodiments, when a UE (such as the UE 116) is configured to provide HARQ-ACK information according to a Type-2 HARQ-ACK codebook, a first value of a DAI field in a first DCI format scheduling a PDSCH reception with TBs that the UE is indicated to not provide corresponding HARQ-ACK information is not incremented relative to a second value of a DAI field in a last DCI format scheduling a PDSCH reception with TBs that the UE is indicated to provide corresponding HARQ-ACK information. However, the UE can use the first value of the DAI field in the first DCI format for the Type-2 HARQ-ACK codebook construction as the first value can inform the UE of a number of DCI formats that the UE failed to correctly receive and scheduled PDSCH reception with TBs that the UE is expected to provide corresponding HARQ-ACK information. Therefore, for the construction of a Type-2 HARQ-ACK codebook, the UE processes a first value of a DAI field in a first DCI format scheduling a PDSCH reception with TB s that the UE is indicated to not provide corresponding HARQ-ACK information as for a second value of a DAI field in a second DCI format scheduling a PDSCH reception with TBs that the UE is indicated to provide corresponding HARQ-ACK information with the exception that the UE does not provide HARQ-ACK information associated with the first DCI format.

The method 1100 of FIG. 11 illustrates an example procedure for a UE to determine a Type-2 HARQ-ACK codebook based on a value of a DAI field in a DCI format that indicates disabling of HARQ-ACK information associated with the DCI format according to embodiments of this disclosure.

In step 1110, a UE (such as the UE 116) receives a first DCI format that provides a first value of a DAI field and schedules a PDSCH reception with TBs that the UE is indicated to provide corresponding HARQ-ACK information according to a Type-2 HARQ-ACK codebook. In step 1120, the UE receives a second DCI format, that is the next DCI format after the first DCI format, that provides a second value of the DAI field and schedules a PDSCH reception with TB s that the UE is indicated to not provide corresponding HARQ-ACK information. In step 1130, the UE determines a Type-2 HARQ-ACK codebook for the HARQ-ACK information based on the second value of the DAI field. In step 1140, the UE multiplexes the Type-2 HARQ-ACK codebook in a PUCCH or PUSCH and transmits the PUCCH or PUSCH.

Although FIG. 9 illustrates the method 900, the FIG. 10 illustrates the method 1000, and the FIG. 11 illustrates the method 1100 various changes may be made to FIGS. 9-11. For example, while the method 900 is shown as a series of steps, various steps could overlap, occur in parallel, occur in a different order, or occur multiple times. In another example, steps may be omitted or replaced by other steps. For example, steps of the method 900 can be executed in a different order.

Embodiments of the present disclosure describe power determination for a PUCCH transmission triggered only due to incorrect TB receptions. This is described in the following examples and embodiments, such as those of FIG. 12. That is, embodiments of the disclosure considers a determination by a UE of a power for a PUCCH transmission that occurs only when the UE incorrect receives one or more TBs.

Figure 12:
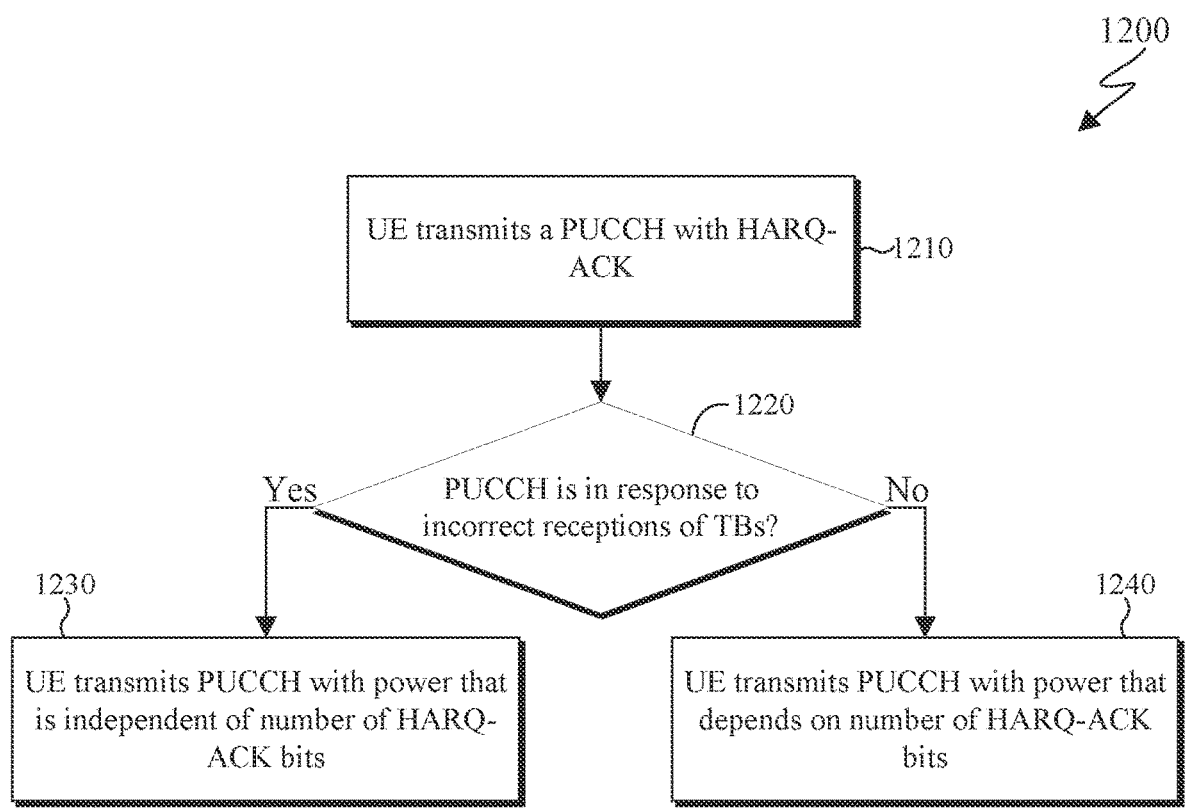
FIG. 12 illustrates an example method for determining power for a PUCCH transmission based on PUCCH resource selection according to embodiments of the present disclosure.

FIG. 12 illustrates an example method 1200 for determining power for a PUCCH transmission based on PUCCH resource selection according to embodiments of the present disclosure.

The steps of the method 1200 of FIG. 12 can be performed by any of the UEs 111-119 of FIG. 1, such as the UE 116 of FIG. 3. The method 1200 is for illustration only and other embodiments can be used without departing from the scope of the present disclosure.

In certain embodiments, a decision by a serving gNB (such as the BS 102) for whether or not there is PUCCH reception in a first PUCCH resource is independent of a decision by the serving gNB for whether or not there is PUCCH reception in a second PUCCH resource. Additionally, it is also possible that the gNB makes either or both decisions for PUCCH receptions in a slot. A UE (such as the UE 116) can use a same power to transmit a first PUCCH in a first PUCCH resource to indicate a first combination of NACK values for reception of corresponding TBs and to transmit a second PUCCH in a second PUCCH resource to indicate a second combination of NACK values for reception of corresponding TBs, when the first and second PUCCH transmissions are based on a same PUCCH format such as PUCCH format 0 or PUCCH format 1. Therefore, unlike a PUCCH transmission with HARQ-ACK information that can include ACK or NACK values, the UE does not adjust a power of a PUCCH transmission depending on a combination of NACK values (and ACK values) that the UE provides. It is noted that by indicating NACK values as HARQ-ACK information for some TBs through a PUCCH transmission in a corresponding resource, a UE also indicates a ACK value as HARQ-ACK information for the remaining TB s.

A power of a PUCCH transmission in a slot can depend on whether the PUCCH transmission provides HARQ-ACK information with ACK or NACK values or whether the PUCCH transmission provides a combination of ACK and NACK values for corresponding TB receptions through a PUCCH resource selection (and the UE does not transmit a PUCCH when the UE correctly receives all TBs with HARQ-ACK information provided in the slot).

A PUCCH transmission that provides one HARQ-ACK information bit with ACK or NACK value uses binary phase shift keying (BPSK) modulation. A PUCCH transmission that occurs only when the UE does not correctly receive at least one TB uses on-off keying (OOK) modulation. For a same target block error rate (BLER), BPSK requires 3 dB smaller signal-to-interference and noise ratio (SINR) than OOK. Therefore, a power of a first PUCCH transmission that occurs only in response to incorrect TB reception (OOK) needs to be with twice a power (3 dB larger) of a second PUCCH transmission that provides an HARQ-ACK information bit with ACK or NACK values, when the first and second PUCCH transmissions are both based on PUCCH format 0 or on PUCCH format 1.

In certain embodiments, an offset can be included for the determination of a power for a PUCCH transmission based on OOK over a PUCCH transmission that occurs regardless of correct or incorrect TB receptions. The offset can be provided to a UE from a serving gNB by higher layer signaling or can be specified in the system operation such as 3 dB. Using higher layer signaling enable more flexible operation as it is possible for the gNB to account for other variables, such as independent settings of received energy/power thresholds to determine a presence for received PUCCH based on PUCCH resource selection and presence for received PUCCH based on a deterministic PUCCH resource, or to operate with different corresponding BLERs as NACK-to-ACK errors have a different impact on the system operation than ACK-to-NACK errors.

There are several approaches for a serving gNB (such as the BS 102) to provide the offset by higher layers. In a first approach, the offset can be provided by a value $P_{offset}$ of a new higher layer parameter. Also, when the offset is provided by a value $P_{offset}$, a value of $\Delta_{F\_PUCCH}$ corresponding to a PUCCH format 0 can be same regardless of whether PUCCH format 0 or PUCCH format 1 is used for a PUCCH transmission based on OOK.

In a second approach, a value for an existing parameter in the power control formula can be separately provided for PUCCH transmission based on OOK, for example a value of $P_{O\_PUCCH,b,f,c}$ or of $\Delta_{F\_PUCCH}$ can be separately provided. For example, a power for a PUCCH transmission that indicates HARQ-ACK information bits using PUCCH resource selection (based on OOK) can be determined as described in Equation (10) where $P_{offset}$ is additionally provided by higher layers.

$$P_{PUCCH,b,f,c} = \min\left\{ \begin{array}{c} P_{CMAX,f,c} \\ P_{O\_PUCCH,b,f,c} + 10\log_{10}(2^{\mu} \cdot M_{RB,b,f,c}^{PUCCH}) + PL_{b,f,c} + P_{offset} + \Delta_{F\_PUCCH} + \Delta_{TF,b,f,c} + g_{b,f,c} \end{array} \right\} [dBm] \quad (10)$$

The method 1200 of FIG. 12 illustrates an example procedure for a UE to determine a power for a PUCCH transmission based on PUCCH resource selection according to embodiments of this disclosure.

In step 1210, a UE (such as the UE 116) transmits a PUCCH with HARQ-ACK information. In step 1220, the determines whether the PUCCH transmission is in response to incorrect receptions of TBs. When the PUCCH transmission is in response to incorrect receptions of TBs (as determined in step 1220), the UE in step 1230 determines a PUCCH resource based on a combination of HARQ-ACK information bits with ACK and NACK values and transmits the PUCCH with a power that is independent of a number of HARQ-ACK information bits. Alternatively, when the UE determines (in step 1220) that PUCCH resource based on signaling from a serving gNB (by higher layers or in DCI formats), then the UE in step 1240 transmits the PUCCH with a power that depends on a number of HARQ-ACK information bits.

In certain embodiments, a DCI format scheduling a PDSCH reception by a UE can also indicate whether the UE should transmit a PUCCH that provides corresponding HARQ-ACK information with ACK or NACK values or transmit a PUCCH only when a TB provided by the PDSCH reception is incorrectly received. Based on the indication by the DCI format, the UE can determine a first set of parameters for the PUCCH transmission when the PUCCH provides HARQ-ACK information with ACK or NACK values and a second set of parameters for the PUCCH transmission when the PUCCH is triggered only in response to an incorrect TB reception. For example, in the former case, the UE can determine a first transmission power based on Equation (1) or depending on a number of HARQ-ACK information bits while in the latter case the UE can determine a PUCCH transmission power based on Equation (10) or independently of a number of HARQ-ACK information bits. For example, in the former case, the UE can apply a first interpretation for a value of a PUCCH resource indication (PRI) field in the DCI format and determine a PUCCH resource from a first set of PUCCH resources while in the latter case the UE can apply a second interpretation for a value of the PRI field in the DCI format and determine a PUCCH resource from a second set of PUCCH resources. It is also possible that when a PUCCH transmission is triggered in response to incorrect TB receptions, the PUCCH resources are provided by higher layers, instead of being indicated by a value of a PRI field or that, instead of indicating a PUCCH resource from a set of PUCCH resources, the PRI field indicates a set of PUCCH resources for the UE to select a PUCCH resource from to transmit a PUCCH based on a combination of ACK and NACK values for respective TBs.

Although FIG. 12 illustrates the method 1200 various changes may be made to FIG. 12. For example, while the method 1200 is shown as a series of steps, various steps could overlap, occur in parallel, occur in a different order, or occur multiple times. In another example, steps may be omitted or replaced by other steps. For example, steps of the method 1200 can be executed in a different order.

Embodiments of the present disclosure describe a resolution of overlapping between a PUCCH transmission triggered by incorrect TB receptions and other PUCCH transmissions. This is described in the following examples and embodiments, such as those of FIGS. 13 and 14. That is, embodiments of the disclosure considers procedures to resolve an overlapping between a PUCCH transmission triggered by incorrect TB receptions and other PUCCH transmissions. The other PUCCH transmissions include a PUCCH transmission with HARQ-ACK information providing ACK or NACK values, a PUCCH transmission with a negative or positive scheduling request (SR), or a PUCCH transmission with CSI and their combinations.

Figure 13:
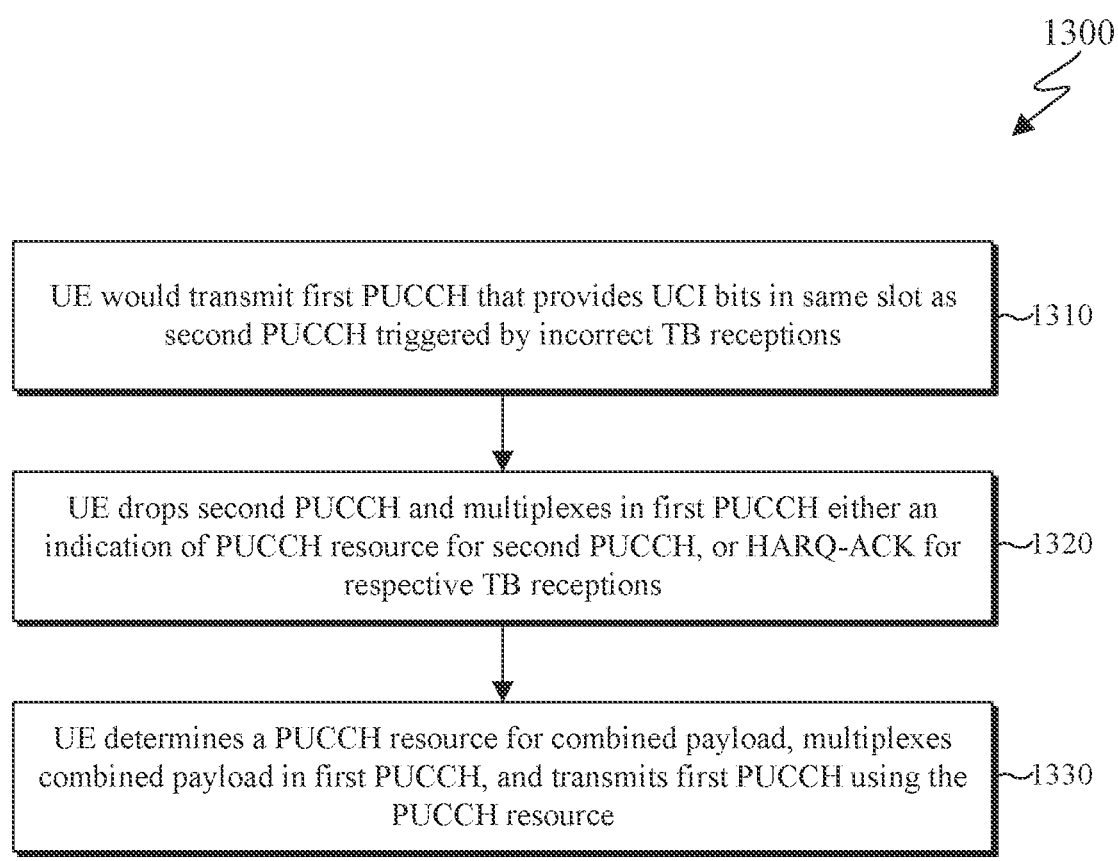
FIG. 13 illustrates an example method for multiplexing n a first PUCCH information that the UE would provide by selecting a resource for transmission of a second PUCCH according to embodiments of the present disclosure.
Figure 14:
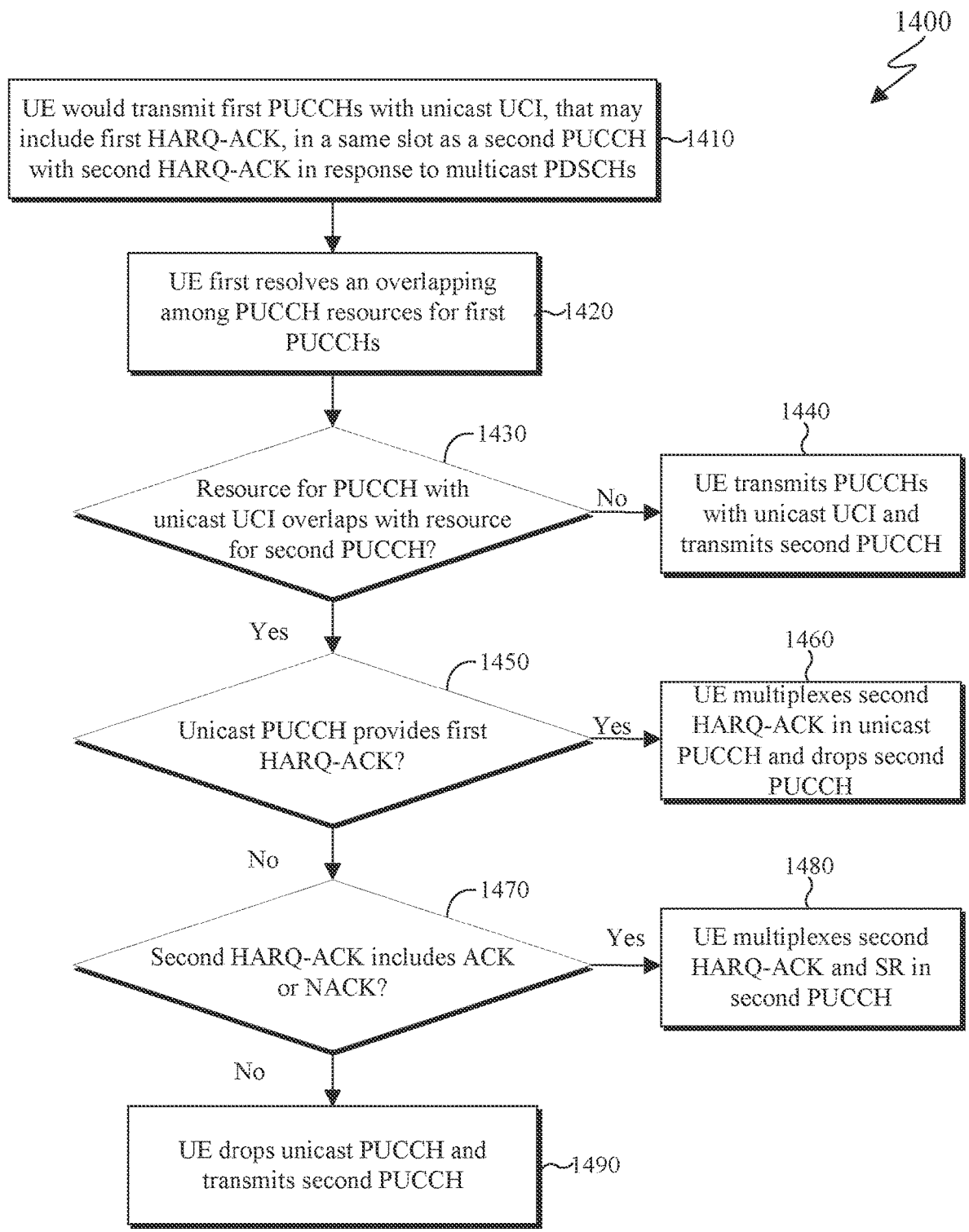
FIG. 14 illustrates an example method for resolving an overlapping of PUCCH resources in a slot among PUCCH transmissions with unicast uplink control information (UCI) and a PUCCH transmission with multicast HARQ-ACK information according to embodiments of the present disclosure.

FIG. 13 illustrates an example method 1300 for multiplexing n a first PUCCH information that the UE would provide by selecting a resource for transmission of a second PUCCH according to embodiments of the present disclosure. FIG. 14 illustrates an example method 1400 for resolving an overlapping of PUCCH resources in a slot among PUCCH transmissions with unicast UCI and a PUCCH transmission with multicast HARQ-ACK information according to embodiments of the present disclosure.

The steps of the method 1300 of FIG. 13 and the method 1400 of FIG. 14, can be performed by any of the UEs 111-119 of FIG. 1, such as the UE 116 of FIG. 3. The methods 1300 and 1400 are for illustration only and other embodiments can be used without departing from the scope of the present disclosure.

In certain embodiments, a first PUCCH transmission that provides first HARQ-ACK information bits with ACK or NACK values is in a same slot as a second PUCCH transmission triggered by incorrect TB receptions. Here, in a first approach, the UE multiplexes (e.g. appends) a number of bits indicating the resource that the UE would use for the second PUCCH transmission to the first HARQ-ACK information bits that are provided by the first PUCCH. After multiplexing the number of bits, the UE determines a PUCCH resource and a power for the first PUCCH based on a total payload for the first HARQ-ACK information bits and the resource indication bits. Thereafter the UE transmits the total payload using the first PUCCH.

In a second approach, instead of indicating a combination of NACK values for received TBs based on a corresponding resource selection, the UE generates second HARQ-ACK information bits with ACK on NACK values for the received TBs and multiplexes (e.g. appends) the second HARQ-ACK information bits with the first HARQ-ACK information. Thereafter, the UE determines a PUCCH resource and a power for the first PUCCH based on a total payload for the first and second HARQ-ACK information bits (including CRC bits, when any). Finally, the UE transmits the total payload using the second PUCCH.

In either the first or the second approach (described above), the multiplexing can be additionally based on a configuration provided by a serving gNB through higher layer signaling. If the multiplexing is not enabled, the UE can transmit the first PUCCH with only the first HARQ-ACK information bits.

A same or similar approach can apply when instead of the first HARQ-ACK information bits, the first PUCCH provides CSI reports. Here the serving gNB can provide a higher layer parameter to the UE indicating whether or not to multiplex a number of bits associated with the second PUCCH with the CSI reports in the first PUCCH.

Also, a same or similar approach can apply when instead of the first PUSCH, the overlapping of the second PUCCH is with a PUSCH. Then, the UE either (i) multiplexes in the PUSCH, in the same manner as for HARQ-ACK information bits, the indication for the PUCCH resource that the UE would use to transmit the second PUCCH or (ii) multiplexes HARQ-ACK information bits with ACK or NACK values in response to the TB receptions.

When the PUSCH is scheduled by a DCI format, the DCI format can include an additional DAI bit. The additional DAI bit can indicate whether the UE should multiplex HARQ-ACK information bits in response to multicast PDSCH receptions. Alternatively, when the PUSCH is scheduled by a DCI format, the DCI format can include a number of bits for an existing DAI field can be increased for example to two bits to indicate (i) no multiplexing of HARQ-ACK information, (ii) multiplexing of HARQ-ACK information only in response to unicast PDSCH receptions (or, only associated with DCI formats with CRC scrambled by a C-RNTI, and MCS-C-RNTI, or a CS-RNTI), (iii) multiplexing of HARQ-ACK information only in response to multicast PDSCH receptions (or, only associated with DCI formats with CRC scrambled by a G-RNTI) or the like.

The method 1300 of FIG. 13 describes an example procedure for a UE to multiplex in a first PUCCH information that the UE would provide by selecting a resource for transmission of a second PUCCH according to embodiments of this disclosure.

In step 1310, a UE (such as the UE 116) would transmit a first PUCCH that provides UCI bits, such as first HARQ-ACK information bits with ACK or NACK values, in a same slot as a second PUCCH triggered by incorrect TB receptions (from a number of TB receptions). In step 1320, the UE drops the second PUCCH transmission and multiplexes in the first PUCCH transmission either a number of bits that indicate a PUCCH resource for the second PUCCH transmission, from a known maximum number of PUCCH resources, or second HARQ-ACK information bits with ACK or NACK values for the TB receptions. The multiplexing can be by appending the indication of the PUCCH resource or the second HARQ-ACK information bits to the UCI bits prior to encoding. In step 1330, the UE determines a PUCCH resource for the combined payload, multiplexes the combined payload in the first PUCCH, and transmits the first PUCCH using the PUCCH resource.

In certain embodiments, when a first PUCCH transmission, triggered by incorrect TB receptions, overlaps with a second PUCCH transmission that provides a negative of positive SR, the UE transmits the first PUCCH, and does not transmit the second PUCCH, when the SR is negative. When the SR is positive, in a first approach, the UE can be configured to transmit one of the first PUCCH or the second PUCCH. The configuration can be based on the specifications of the system operation, such as for example to transmit the first PUCCH regardless of the SR values. For another example, the configuration can be provided by a serving gNB through higher layer signaling. In a second approach, the UE can be provided a first set of PUCCH resources and a second set of PUCCH resources for the first PUCCH transmission, wherein the UE selects a PUCCH resource from the first set of PUCCH resources when the SR is negative and selects a PUCCH resource from the second set of PUCCH resources when the SR is positive.

In certain embodiments, when a UE (such as the UE 116) supports, in a same slot, first and second PUCCH transmissions that respectively provide first and second HARQ-ACK information in response to unicast and multicast PDSCH receptions, the first and second PUCCH transmissions may mutually overlap and may also overlap with PUCCH transmissions providing SR or CSI. Then, the UE performs one of the three following approaches.

In a first approach, the UE first resolves an overlapping among PUCCH transmissions providing unicast UCI before resolving an overlapping with the second PUCCH transmission providing multicast HARQ-ACK information. The UE subsequently resolves an overlapping, when any, between a PUCCH resource resulting after resolving the overlapping among PUCCH transmissions providing unicast UCI and a second PUCCH resource for the second PUCCH transmission. The first approach enables the UE to maintain a same procedure for resolving overlapping for PUCCH transmissions with unicast UCI and to separately consider a PUCCH transmission with HARQ-ACK information associated with multicast PDSCH receptions.

In a second approach, the UE does not distinguish the PUCCH resource for the second PUCCH transmission from the PUCCH resources for the PUCCH transmissions with unicast UCI and the UE resolves the overlapping by determining a new PUCCH resource for any of the overlapping PUCCH resources, for example following a same procedure as described in REF3 by also considering the PUCCH resource for the second PUCCH transmission.

In a third approach, the UE first resolves an overlapping, when any, between the first and second PUCCH transmissions and subsequently resolves an overlapping, when any, with other PUCCH transmissions providing SR or CSI. Whether or not multiplexing of CSI and HARQ-ACK information in a same PUCCH is enabled can be configured to a UE from a serving gNB by higher layer signaling that can be separate for unicast HARQ-ACK information and for multicast HARQ-ACK information.

In certain embodiments, for multiplexing multicast HARQ-ACK information and CSI, when enabled, the PUCCH resource for the unicast PUCCH providing the CSI can be used when the multicast HARQ-ACK information is provided via a mapping to a PUCCH resource for the second PUCCH transmission. Otherwise either the PUCCH resource for the unicast PUCCH or the PUCCH resource for the multicast PUCCH can be used as specified in the system operation or as configured from a serving gNB by higher layers. A specification can include selection of the PUCCH resource based on an ability to support the combined payload of CSI and multicast HARQ-ACK information bits. Enabling multiplexing of CSI and multicast HARQ-ACK information can be separately indicated for the case that the multicast HARQ-ACK information includes ACK or NACK values and the case that the multicast HARQ-ACK information is via a resource selection for a PUCCH transmission in response to incorrect reception of TBs.

The method 1400 of FIG. 14 describes an example procedure for a UE to resolve an overlapping of PUCCH resources in a slot among PUCCH transmissions with unicast UCI and a PUCCH transmission with multicast HARQ-ACK information according to embodiments of this disclosure.

For brevity, a PUCCH with CSI is not considered (unicast UCI includes HARQ-ACK information or SR).

In step 1410, a UE (such as the UE 116) would transmit first PUCCHs that provide unicast UCI, that may include first HARQ-ACK information, in a same slot as a second PUCCH that provides second HARQ-ACK information in response to multicast PDSCH receptions. In step 1420, the UE first resolves an overlapping among PUCCH resources for the first PUCCHs.

In step 1430, the UE determines whether any of the PUCCH resources for PUCCH transmissions that include unicast UCI overlaps with a PUCCH resource for the second PUCCH. When there is no overlapping (as determined in step 1430), the UE in step 1440 transmits the PUCCHs that include the unicast UCI and transmits the second PUCCH (assuming no overlapping with a PUSCH transmission on the same cell).

Alternatively, when there is overlapping (as determined in step 1430), the UE considers the type of UCI in the unicast PUCCH (step 1450). If the unicast PUCCH provides first HARQ-ACK information (as determined in step 1450), the UE in step 1460 multiplexes the second HARQ-ACK information in the unicast PUCCH and drops the transmission of the second PUCCH.

Alternatively, if the unicast PUCCH provides SR (as determined in step 1450), the UE in step 1470 determines whether the second HARQ-ACK information includes ACK or NACK values or is a mapping of HARQ-ACK information to a PUCCH resource. When the second HARQ-ACK information includes ACK or NACK values (as determined in step 1470), the UE in step 1480 multiplexes the second HARQ-ACK information and the SR in the second PUCCH. Alternatively, when the second HARQ-ACK information does not includes ACK nor NACK values (as determined in step 1470), the UE in step 1490 drops the transmission of the unicast PUCCH and transmit the second PUCCH.

Although FIG. 13 illustrates the method 1300 and the FIG. 14 illustrates the method 1400 various changes may be made to FIGS. 13 and 14. For example, while the method 1300 and the method 1400 are shown as a series of steps, various steps could overlap, occur in parallel, occur in a different order, or occur multiple times. In another example, steps may be omitted or replaced by other steps. For example, steps of the method 1300 and the method 1400 can be executed in a different order.

Embodiments of the present disclosure describe resource determination when a PUCCH transmission with HARQ-ACK information in response to multicast PDSCH receptions is in a same slot as a PUCCH transmission with HARQ-ACK information in response to SPS PDSCH receptions. This is described in the following examples and embodiments, such as those of FIG. 15. That is, embodiments of the disclosure considers procedures to multiplex HARQ-ACK information in response to multicast PDSCH receptions (scheduled by a DCI format with CRC scrambled by a G-RNTI or activated by a DCI format scrambled with a G-CS-RNTI) with HARQ-ACK information in response to SPS PDSCH receptions (activated by a CS-RNTI). The HARQ-ACK information in response to multicast PDSCH receptions can include ACK or NACK values, or the HARQ-ACK information can be a PUCCH resource indication as described in the previous embodiments.

Figure 15:
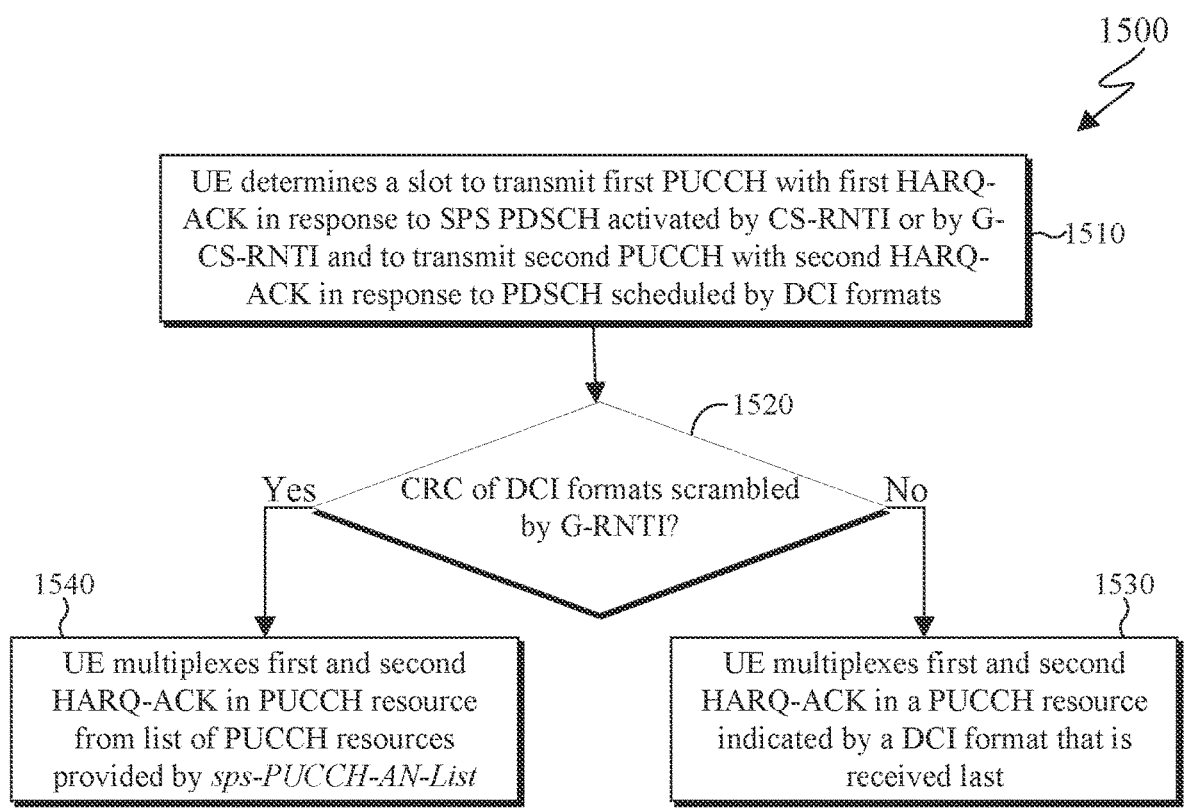
FIG. 15 illustrates an example method for determining a PUCCH resource for multiplexing first and second HARQ-ACK according to embodiments of the present disclosure.

FIG. 15 illustrates an example method 1500 for determining a PUCCH resource for multiplexing first and second HARQ-ACK according to embodiments of the present disclosure.

The steps of the method 1500 of FIG. 15 can be performed by any of the UEs 111-119 of FIG. 1, such as the UE 116 of FIG. 3. The method 1500 is for illustration only and other embodiments can be used without departing from the scope of the present disclosure.

In certain embodiments, a UE (such as the UE 116) procedure to determine a PUCCH resource to transmit a PUCCH in a slot in order to provide first HARQ-ACK information in response to SPS PDSCH receptions activated by DCI formats with CRC scrambled by a CS-RNTI, when the UE would also transmit a second PUCCH in the slot that provides second HARQ-ACK information in response to PDSCH receptions scheduled by DCI formats, depends on a RNTI used to scramble the CRC of the DCI formats. When the RNTI is a C-RNTI, the UE multiplexes the first and second HARQ-ACK information in a PUCCH resource indicated by a DCI format, from the DCI formats, that is received last (the corresponding PDCCH); otherwise, when the RNTI is a G-RNTI, the UE multiplexes the first and second HARQ-ACK information in a PUCCH resource from the list of PUCCH resources provided by sps-PUCCH-AN-List. A reason for the different UE procedures for determining a PUCCH resource depending on the RNTI is because DCI formats with CRC scrambled by a C-RNTI can indicate a PUCCH resource that is specific to the UE, and can therefore account for the HARQ-ACK information in response to SPS PDSCH receptions, while DCI formats with CRC scrambled by a G-RNTI cannot generally indicate a PUCCH resource that is specific to the UE.

A UE can determine one of four PUCCH resources when a UE does one of the following. For example, when a UE transmits in a slot a first PUCCH with HARQ-ACK information in response to SPS PDSCH receptions that are activated by a DCI format scrambled by a CS-RNTI (unicast SPS PDSCH receptions), the UE would determine a PUCCH resource to be one of the four PUCCH resources described below. For another example, when a UE detects DCI formats with CRC scrambled by G-RNTI (multicast DCI formats) that schedule PDSCH receptions and indicate the slot for a second PUCCH transmission with corresponding HARQ-ACK information, the UE would determine a PUCCH resource to be one of the four PUCCH resources described below. For another example, when a UE does not detect any DCI format with CRC scrambled by C-RNTI (unicast DCI format) that indicates a PUCCH transmission in the slot, the UE would determine a PUCCH resource to be one of the four PUCCH resources described below. For another example, when a UE is provided a list of PUCCH resources by SPS-PUCCH-AN-List, the UE would determine a PUCCH resource to be one of the four PUCCH resources described below. For yet another example, when a UE transmits or multiplexes $O_{UCI}+O_{M-ACK}$ UCI information bits that include only $O_{UCI}$ HARQ-ACK information bits in response to one or more SPS PDSCH receptions and SR bits, if any, and $O_{M-ACK}$ HARQ-ACK information bits in response to PDSCH receptions scheduled by DCI formats with CRC scrambled by G-RNTI, the UE would determine a PUCCH resource to be one of the four PUCCH resources described below.

In a first approach, the UE can determine the PUCCH resource to be a PUCCH resource provided by sps-PUCCH-AN-ResourceID obtained from the first entry in sps-PUCCH-AN-List if $O_{UCI}+O_{M-ACK} \leq 2$. In a second approach, the UE can determine the PUCCH resource to be a PUCCH resource provided by sps-PUCCH-AN-ResourceID obtained from the second entry in sps-PUCCH-AN-List, if provided, if $2<O_{UCI}+O_{M-ACK} \leq N_{1,SPS}$ where $N_{1,SPS}$ is either provided by maxPayloadSize obtained from the second entry in sps-PUCCH-AN-List or is otherwise equal to 1706. In a third approach, the UE can determine the PUCCH resource to be a PUCCH resource provided by sps-PUCCH-AN-ResourceID obtained from the third entry in sps-PUCCH-AN-List, if provided, if $N_{1,SPS}<O_{UCI}+O_{M\_ACK} \leq N_{2,SPS}$ where $N_{2,SPS}$ is either provided by maxPayloadSize obtained from the third entry in sps-PUCCH-AN-List or is otherwise equal to 1706. In a fourth approach, the UE can determine the PUCCH resource to be a PUCCH resource provided by sps-PUCCH-AN-ResourceID obtained from the fourth entry in sps-PUCCH-AN-List, if provided, if $N_{2,SPS}<O_{UCI}+O_{M-ACK} \leq N_{3,SPS}$ where $N_{3,SPS}$ is equal to 1706.

In certain embodiments, a same or similar procedure can apply if instead of HARQ-ACK information in response to unicast SPS PDSCH receptions activated by a DCI format with a CS-RNTI, the HARQ-ACK information is in response to multicast SPS PDSCH receptions activated by a DCI format with a G-CS-RNTI and corresponding PUCCH resources are provided by SPS-Multicast-PUCCH-AN-List instead of SPS-PUCCH-AN-List. In particular, a UE can be provided a second PUCCH resource list, by SPS-Multicast-PUCCH-AN-List, for PUCCH transmissions with HARQ-ACK information corresponding to SPS PDSCH receptions activated by DCI formats with CRC scrambled by a G-CS-RNTI (multicast SPS PDSCH). When a UE would transmit in a slot a first PUCCH with HARQ-ACK information in response to multicast SPS PDSCH receptions and a second PUCCH in response to multicast PDSCH receptions scheduled by DCI formats with CRC scrambled by G-RNTI, the UE multiplexes all HARQ-ACK information using a PUCCH resource provided by SPS-Multicast-PUCCH-AN-List.

For example, when a UE transmits in a slot a first PUCCH with HARQ-ACK information in response to SPS PDSCH receptions that are activated by a DCI format scrambled by a G-CS-RNTI (multicast SPS PDSCH receptions), the UE would determine a PUCCH resource to be one of the five PUCCH resources described below. For another example, when a UE detects DCI formats with CRC scrambled by G-RNTI (multicast DCI formats) that schedule PDSCH receptions and indicate the slot for a second PUCCH transmission with corresponding HARQ-ACK information, the UE would determine a PUCCH resource to be one of the five PUCCH resources described below. For another example, when a UE does not detect any DCI format with CRC scrambled by C-RNTI (unicast DCI format) that indicates a PUCCH transmission in the slot, the UE would determine a PUCCH resource to be one of the five PUCCH resources described below. For another example, when a UE is provided a list of PUCCH resources by SPS-Multicast- PUCCH-AN-List, the UE would determine a PUCCH resource to be one of the five PUCCH resources described below. For another example, when a UE transmits or multiplexes $O_{M\text{-}ACK\text{-}SPS}+O_{M\text{-}ACK}$ HARQ-ACK information bits that include only $O_{M\text{-}ACK\text{-}SPS}$ HARQ-ACK information bits in response to one or more SPS PDSCH receptions and $O_{M\text{-}ACK}$ HARQ-ACK information bits in response to PDSCH receptions scheduled by DCI formats with CRC scrambled by G-RNTI.

In a first approach, the UE can determine the PUCCH resource to be a PUCCH resource provided by sps-Multicast-PUCCH-AN-ResourceID obtained from the first entry in sps-Multicast-PUCCH-AN-List if $O_{M\text{-}ACK\text{-}SPS}+O_{M\text{-}ACK}\leq 2$. In a second approach, the UE can determine the PUCCH resource to be a PUCCH resource provided by sps-Multicast-PUCCH-AN-ResourceID obtained from the second entry in sps-Multicast-PUCCH-AN-List, if provided, if $2<O_{M\text{-}ACK\text{-}SPS}+O_{M\text{-}ACK}\leq N_{1,M\text{-}SPS}$ where $N_{1,M\text{-}SPS}$ is either provided by maxPayloadSize obtained from the second entry in sps-Multicast-PUCCH-AN-List or is otherwise equal to 1706. In a third approach, the UE can determine the PUCCH resource to be a PUCCH resource provided by sps-Multicast-PUCCH-AN-ResourceID obtained from the third entry in sps-Multicast-PUCCH-AN-List, if provided, if $N_{1,M\text{-}SPS}<O_{M\text{-}ACK\text{-}SPS}+O_{M\text{-}ACK}\leq N_{2,M\text{-}SPS}$ where $N_{2,M\text{-}SPS}$ is either provided by maxPayloadSize obtained from the third entry in sps-Multicast-PUCCH-AN-List or is otherwise equal to 1706. In a fourth approach, the UE can determine the PUCCH resource to be a PUCCH resource provided by sps-Multicast-PUCCH-AN-ResourceID obtained from the fourth entry in sps-Multicast-PUCCH-AN-List, if provided, if $N_{2,M\text{-}SPS}<O_{M\text{-}ACK\text{-}SPS}+O_{M\text{-}ACK}\leq N_{3,M\text{-}SPS}$ where $N_{3,M\text{-}SPS}$ is equal to 1706. In a fifth approach, if the UE is configured to transmit a PUCCH with negative or positive SR in a same slot as the PUCCH providing HARQ-ACK information associated with multicast PDSCH receptions, the UE the $O_{SR}$ bits can be added to the $O_{M\text{-}ACK\text{-}SPS}+O_{M\text{-}ACK}$ bits when determining the PUCCH resource. The multiplexing of SR with multicast HARQ-ACK information can be default UE operation or can be configured by higher layers from a serving gNB.

In certain embodiments, it is possible that when a UE receives a DCI format with CRC scrambled by G-RNTI, the UE uses a PUCCH indicated by a PUCCH resource indicator field in the DCI format instead of a PUCCH resource determined from SPS-PUCCH-AN-List or from SPS-Multicast-PUCCH-AN-List.

The method 1500 as illustrated in FIG. 15 describes an example procedure for a UE to determine a PUCCH resource for multiplexing first and second HARQ-ACK information according to embodiments of this disclosure.

In step 1510, a UE (such as the UE 116) determines a slot to transmit a first PUCCH with first HARQ-ACK information in response to SPS PDSCH receptions activated by a CS-RNTI or by a G-CS-RNTI and determines the slot to transmit a second PUCCH with second HARQ-ACK information in response to PDSCH receptions scheduled by DCI formats.

In step 1520, the UE determines whether the CRC of the DCI formats is scrambled by a G-RNTI. When the RNTI is a C-RNTI (unicast DCI format, as determined in step 1520), the UE in step 1530 multiplexes the first and second HARQ-ACK information in a PUCCH resource indicated by a DCI format, from the DCI formats, that is received last (the corresponding PDCCH). Alternatively, when the RNTI is a G-RNTI (multicast DCI format, as determined in step 1520), the UE in step 1540 multiplexes the first and second HARQ-ACK information in a PUCCH resource from the list of PUCCH resources provided by sps-PUCCH-AN-List.

In certain embodiments, when a UE (such as the UE 116) transmits in a slot a first PUCCH with first HARQ-ACK information of $O_{ACK}$ bits in response to SPS PDSCH receptions activated by DCI formats with CRC scrambled by CS-RNTI using a PUCCH resource from a list provided by SPS-PUCCH-AN-List and a second PUCCH with second HARQ-ACK information of $O_{M\text{-}ACK\text{-}SPS}$ bits in response to SPS PDSCH receptions activated by DCI formats with CRC scrambled by G-CS-RNTI using a PUCCH resource provided by SPS-Multicast-PUCCH-AN-List, the UE can determine a PUCCH resource from SPS-PUCCH-AN-List that corresponds to a payload of $O_{ACK}+O_{M\text{-}ACK\text{-}SPS}$ bits.

If the UE also multiplexes $O_{M\text{-}ACK}$ HARQ-ACK information bits in response to PDSCH receptions scheduled by DCI formats with CRC scrambled by G-RNTI or also multiplexes $O_{SR}$ SR bits, the PUCCH is the one that corresponds to a payload of $O_{ACK}+O_{M\text{-}ACK\text{-}SPS}+O_{M\text{-}ACK}+O_{SR}$ bits. If there is no PUCCH resource from SPS-PUCCH-AN-List that can be used to multiplex $O_{ACK}+O_{M\text{-}ACK\text{-}SPS}+O_{M\text{-}ACK}+O_{SR}$ (with some values being equal to zero if corresponding UCI is not multiplexed in the slot), the UE uses a PUCCH resource from SPS-Multicast-PUCCH-AN-List. If there is no PUCCH resource from SPS-Multicast-PUCCH-AN-List that can be used to multiplex $O_{ACK}+O_{M\text{-}ACK\text{-}SPS}+O_{M\text{-}ACK}+O_{SR}$, the UE uses a PUCCH resource from SPS-PUCCH-AN-List or from SPS-Multicast-PUCCH-AN-List that can support the largest UCI payload. If a PUCCH resource from SPS-PUCCH-AN-List and a PUCCH resource from SPS-Multicast-PUCCH-AN-List support a same largest UCI payload, the UE uses the PUCCH resource from SPS-PUCCH-AN-List. It is also possible that the gNB configures to the UE whether to use a PUCCH resource from SPS-PUCCH-AN-List or from SPS-Multicast-PUCCH-AN-List.

If there is no PUCCH resource from SPS-PUCCH-AN-List or from SPS-Multicast-PUCCH-AN-List that a UE can use to multiplex first HARQ-ACK information corresponding to SPS PDSCH receptions associated with a CS-RNTI and second HARQ-ACK information corresponding to SPS PDSCH receptions associated with a G-CS-RNTI, the UE can multiplex the first HARQ-ACK information and drop/cancel multiplexing of the second HARQ-ACK information. If multiplexing is possible but a target code rate cannot be achieved for both the first and the second HARQ-ACK information, the UE first allocates resource elements of the PUCCH resource for multiplexing the first HARQ-ACK information and allocates remaining resource elements, if any, of the PUCCH resource for multiplexing the second HARQ-ACK information. Alternatively, the UE may drop the second HARQ-ACK information.

In certain embodiments, when a UE would transmit in a slot a first PUCCH with first (unicast) HARQ-ACK information in a first PUCCH resource indicated by a DCI format with CRC scrambled by C-RNTI, or MCS-C-RNTI, or CS-RNTI and any second PUCCH with second (multicast) HARQ-ACK information associated with a G-RNTI or G-CS-RNTI, the UE multiplexes the first and second HARQ-ACK information in a PUCCH using the first PUCCH resource.

In certain embodiments, when a UE would transmit in a slot a first PUCCH with first HARQ-ACK information in a first PUCCH resource indicated by a DCI format with CRC scrambled by G-RNTI and a second PUCCH with second HARQ-ACK information in response to SPS PDSCH receptions, that are activated by a DCI format with CRC scrambled by a CS-RNTI or by a G-CS-RNTI, in a second PUCCH resource from a list of PUCCH resources, the UE multiplexes the first and second HARQ-ACK information in a PUCCH using a PUCCH resource from the list of PUCCH resources.

In certain embodiments, when a UE would transmit in a slot a first PUCCH with first HARQ-ACK information in response to SPS PDSCH receptions that are activated by a DCI format with CRC scrambled by a CS-RNTI in a first PUCCH resource from a first list of PUCCH resources and a second PUCCH with second HARQ-ACK information in response to SPS PDSCH receptions that are activated by a DCI format with CRC scrambled by a G-CS-RNTI in a second PUCCH resource from a second list of PUCCH resources. For example, when there is a resource from the first list of resources corresponding to the total number of first and second HARQ-ACK information bits, the UE multiplexes the first and second HARQ-ACK information in a PUCCH using the PUCCH resource from the first list of PUCCH resources. Otherwise, if there is a resource from the second list of resources corresponding to the total number of first and second HARQ-ACK information bits, the UE multiplexes the first and second HARQ-ACK information in a PUCCH using the PUCCH resource from the second list of PUCCH resources. Otherwise, the UE multiplexes the first and second HARQ-ACK information in a PUCCH using a PUCCH resource from the first list of PUCCH resources or from the second list of PUCCH resources that corresponds to the largest of UCI bits (and chooses a PUCCH resource from the first list if a same maximum number of UCI bits can be supported by PUCCH resources from the first list and from the second list).

Although FIG. 15 illustrates the method 1500 various changes may be made to FIG. 15. For example, while the method 1500 is shown as a series of steps, various steps could overlap, occur in parallel, occur in a different order, or occur multiple times. In another example, steps may be omitted or replaced by other steps. For example, steps of the method 1500 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a terminal in a wireless communication system, the method comprising:
receiving, from a base station, a first downlink reception, wherein the first downlink reception is a unicast semi-persistently scheduled (SPS) physical downlink shared channel (PDSCH) reception;
receiving, from the base station, a second downlink reception, wherein the second downlink reception is a multicast PDSCH reception, the multicast PDSCH reception being associated with one of a multicast downlink control information (DCI) format or a multicast SPS PDSCH reception;
identifying a physical uplink control channel (PUCCH) resource from an SPS-PUCCH-AN-list for the unicast SPS PDSCH reception; and
transmitting, to the base station, first hybrid automatic repeat request acknowledgment (HARQ-ACK) for the first downlink reception and second HARQ-ACK information for the second downlink reception, wherein the first HARQ-ACK information and the second HARQ-ACK information are multiplexed in the PUCCH resource.

2. The method of claim 1, wherein the multicast DCI format is associated with a group radio network temporary identifier (G-RNTI).

3. The method of claim 1, wherein the multicast SPS PDSCH reception is activated by a multicast DCI format associated with a group configured scheduling RNTI (G-CS-RNTI).

4. The method of claim 1, wherein the SPS-PUCCH-AN-list is configured by the base station.

5. A method of claim 1 performed by a base station in a wireless communication system, the method comprising:
transmitting, to a terminal, a first downlink transmission, wherein the first downlink transmission is a unicast semi-persistent scheduling (SPS) physical downlink shared channel (PDSCH) transmission;
transmitting, to the terminal, a second downlink transmission, wherein the second downlink transmission is a multicast PDSCH transmission, the multicast PDSCH transmission being associated with one of a multicast downlink control information (DCI) format or a multicast SPS PDSCH transmission;
identifying a physical uplink control channel (PUCCH) resource from an SPS-PUCCH-AN-list for the unicast SPS PDSCH transmission; and
receiving, from the terminal, first hybrid automatic repeat request acknowledgment (HARQ-ACK) information for the first downlink transmission and second HARQ-ACK information for the second downlink transmission, wherein the first HARQ-ACK information and the second HARQ-ACK information are multiplexed in the PUCCH resource.

6. The method of claim 5, further comprising:
wherein the multicast DCI format is associated with a group radio network temporary identifier (G-RNTI) and the multicast SPS PDSCH transmission is activated by the multicast DCI format associated with a group configured scheduling RNTI (G-CS-RNTI).

7. The method of claim 1, wherein the SPS-PUCCH-AN-list is configured to the terminal.

8. A terminal in a wireless communication system, the terminal comprising:
- a transceiver configured to transmit or receive a signal; and
- a controller coupled with the transceiver and configured to:
  - receive, from a base station, a first downlink reception, wherein the first downlink reception is a unicast semi-persistently scheduled (SPS) physical downlink shared channel (PDSCH) reception, associated with a first radio network temporary identifier (RNTI) from a first set of RNTIs,
  - receive, from the base station, a second downlink reception, wherein the second downlink reception is a multicast PDSCH reception, the multicast PDSCH reception being associated with one of a multicast downlink control information (DCI) format or a multicast SPS PDSCH reception,
  - identify a physical uplink control channel (PUCCH) resource from an SPS-PUCCH-AN-list for the unicast SPS PDSCH reception, and
  - transmit, to the base station, first hybrid automatic repeat request acknowledgment (HARQ-ACK) information for the first downlink reception and second HARQ-ACK information for the second downlink reception, wherein the first HARQ-ACK information and the second HARQ-ACK information are multiplexed in the PUCCH resource.

9. The terminal of claim 8, wherein the t multicast DCI format is associated with a group radio network temporary identifier (G-RNTI).

10. The terminal of claim 8, wherein the multicast SPS PDSCH reception is activated by a multicast DCI format associated with a group configured scheduling RNTI (G-CS-RNTI).

11. The terminal of claim 8, wherein the SPS-PUCCH-AN-list is configured by the base station.

12. A base station in a wireless communication system, the base station comprising:
- a transceiver configured to transmit or receive a signal; and
- a controller coupled with the transceiver and configured to:
  - transmit, to a terminal, a first downlink transmission, wherein the first downlink transmission is a unicast semi-persistent scheduling (SPS) physical downlink shared channel (PDSCH) transmission,
  - transmit, to the terminal, a second downlink transmission, wherein the second downlink transmission is a multicast PDSCH transmission, the multicast PDSCH transmission being associated with one of a multicast downlink control information (DCI) format or a multicast SPS PDSCH transmission,
  - identify a physical uplink control channel (PUCCH) resource from an SPS-PUCCH-AN-list for the unicast SPS PDSCH transmission, and
  - receive, from the terminal, first hybrid automatic repeat request acknowledgment (HARQ-ACK) information for the first downlink transmission and second HARQ-ACK information for the second downlink transmission, wherein the first HARQ-ACK information and the second HARQ-ACK information are multiplexed in the PUCCH resource.

13. The base station of claim 12, wherein the multicast DCI format is associated with a group radio network temporary identifier, G-RNTI.

14. The base station of claim 12, wherein the multicast SPS PDSCH transmission is activated by a multicast DCI format associated with a group configured scheduling RNTI (G-CS-RNTI).

15. The base station of claim 12, wherein the SPS-PUCCH-AN-list is configured to the terminal.

* * * * *